US012676490B2

(12) United States Patent
Nakagawa et al.

(10) Patent No.: US 12,676,490 B2
(45) Date of Patent: Jul. 7, 2026

(54) ELEVATOR WITH CAR HAVING TWO BATTERIES THAT CAN CHARGE EACH OTHER

(71) Applicant: Mitsubishi Electric Corporation, Tokyo (JP)

(72) Inventors: Mariko Nakagawa, Tokyo (JP); Tomokazu Sakashita, Tokyo (JP); Miyuki Takeshita, Tokyo (JP); Hidehito Yoshida, Tokyo (JP); Hirohisa Kuwano, Tokyo (JP); Takuya Miura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 778 days.

(21) Appl. No.: 17/793,934

(22) PCT Filed: Mar. 30, 2020

(86) PCT No.: PCT/JP2020/014474
§ 371 (c)(1),
(2) Date: Jul. 20, 2022

(87) PCT Pub. No.: WO2021/199118
PCT Pub. Date: Oct. 7, 2021

(65) Prior Publication Data
US 2022/0416563 A1     Dec. 29, 2022

(51) Int. Cl.
B60L 58/13        (2019.01)
H02J 7/00         (2006.01)
(Continued)

(52) U.S. Cl.
CPC .............. *H02J 7/342* (2020.01); *B60L 58/13* (2019.02); *H02J 7/50* (2026.01); *H02J 7/82* (2026.01);
(Continued)

(58) Field of Classification Search
CPC ........ H02J 7/342; H02J 7/0013; H02J 7/0048; H02J 7/0063; H02J 7/0068; H02J 7/00712; B60L 58/13
(Continued)

(56) References Cited

U.S. PATENT DOCUMENTS 4,402,387 A * 9/1983 Tsuji ....................... B66B 1/285
                                                        187/293
4,554,999 A * 11/1985 Kamaike ................. B66B 1/302
                                                        187/296
(Continued)

FOREIGN PATENT DOCUMENTS

JP        2011246218 A * 12/2011
JP        2012-6748 A    1/2012
(Continued)

OTHER PUBLICATIONS

English translation (global dossier machine) of JP2012006748A (Year: 2012).*
(Continued)

*Primary Examiner* — John T Trischler
(74) *Attorney, Agent, or Firm* — XSENSUS LLP

(57)        ABSTRACT
An elevator includes: a car moving in a hoistway; a load provided to the car; a first power storage unit, composed of one battery capable of charging and discharging, connected to the load, and supplying power to the load; a second power storage unit, composed of one or more batteries capable of charging and discharging, and connected to the load; a power transmission circuit and capable of transmitting power between the first power storage unit and the second power storage unit; and a control unit controlling the power transmission circuit to supply power from the second power storage unit to the first power storage unit, when it is determined that a remaining stored power amount of the battery constituting the first power storage unit is less than
(Continued)

an amount of power required for driving the load for a certain period of time.

12 Claims, 11 Drawing Sheets

(51) Int. Cl.
| | |
|---|---|
| *H02J 7/34* | (2006.01) |
| *H02J 7/50* | (2026.01) |
| *H02J 7/82* | (2026.01) |
| *H02J 7/90* | (2026.01) |
| *B66B 1/34* | (2006.01) |
| *H02J 105/37* | (2026.01) |

(52) U.S. Cl.
CPC ............. *H02J 7/855* (2026.01); *H02J 7/865* (2026.01); *H02J 7/933* (2026.01); *B66B 1/34* (2013.01); *H02J 2105/37* (2026.01); *H02J 2207/20* (2020.01); *Y02B 50/00* (2013.01)

(58) Field of Classification Search
USPC ................................................ 320/103, 104
See application file for complete search history.

(56) References Cited

U.S. PATENT DOCUMENTS

| | | | | |
|---|---|---|---|---|
| 5,905,360 | A * | 5/1999 | Ukita | H02J 7/0014 320/121 |
| 6,415,892 | B2 * | 7/2002 | Araki | B66B 1/302 187/296 |
| 6,431,323 | B2 * | 8/2002 | Tajima | H02J 3/32 187/296 |
| 6,431,324 | B2 * | 8/2002 | Tajima | B66B 1/30 187/296 |
| 6,435,311 | B2 * | 8/2002 | Araki | B66B 1/30 187/296 |
| 6,435,312 | B2 * | 8/2002 | Tajima | B66B 1/285 187/296 |
| 6,435,313 | B2 * | 8/2002 | Tajima | B66B 1/30 187/296 |
| 6,439,347 | B2 * | 8/2002 | Suga | B66B 1/30 187/296 |
| 6,439,348 | B2 * | 8/2002 | Tajima | B66B 1/30 187/296 |
| 6,454,053 | B2 * | 9/2002 | Tominaga | B66B 1/30 187/296 |
| 6,457,565 | B2 * | 10/2002 | Tominaga | B66B 1/30 187/296 |
| 6,460,658 | B2 * | 10/2002 | Suga | B66B 1/30 187/296 |
| 6,471,013 | B2 * | 10/2002 | Banno | B66B 1/30 187/296 |
| 6,522,099 | B2 * | 2/2003 | Tominaga | H02J 7/34 187/296 |
| 6,533,074 | B2 * | 3/2003 | Tominaga | B66B 1/30 187/296 |
| 6,680,600 | B2 * | 1/2004 | Emori | H01M 16/00 320/126 |
| 6,700,349 | B2 * | 3/2004 | Emori | H02J 7/0014 320/104 |
| 6,747,438 | B2 * | 6/2004 | Emori | B60L 58/20 320/126 |
| 6,828,754 | B2 * | 12/2004 | Yang | H02J 7/342 320/138 |
| 6,873,134 | B2 * | 3/2005 | Canter | H02J 7/0016 320/118 |
| 6,917,181 | B2 * | 7/2005 | Emori | B60L 53/11 320/104 |
| 6,919,648 | B2 * | 7/2005 | Bolz | H02P 9/307 290/40 C |
| 6,977,480 | B2 * | 12/2005 | Emori | B60L 58/20 320/104 |

| | | | | |
|---|---|---|---|---|
| 6,989,653 | B2 * | 1/2006 | Iwata | H02M 3/1582 320/134 |
| 7,743,890 | B2 * | 6/2010 | Nikovski | B66B 1/2458 187/382 |
| 7,863,856 | B2 * | 1/2011 | Sherman | G06F 1/263 320/103 |
| 7,884,569 | B2 * | 2/2011 | Ward | H02J 7/35 180/2.2 |
| 7,896,137 | B2 * | 3/2011 | Ishikawa | B66B 1/34 187/290 |
| 7,940,028 | B1 * | 5/2011 | Hermann | H01M 10/30 320/150 |
| 7,977,912 | B2 * | 7/2011 | Sun | H01M 50/503 361/679.55 |
| 8,004,237 | B2 * | 8/2011 | Manor | H02J 7/342 320/132 |
| 8,022,665 | B2 * | 9/2011 | Duan | H02M 3/1582 320/108 |
| 8,030,882 | B2 * | 10/2011 | Ito | B60L 53/24 307/66 |
| 8,080,973 | B2 * | 12/2011 | King | B60L 58/20 320/132 |
| 8,362,629 | B2 * | 1/2013 | Weber | F04B 17/03 37/348 |
| 8,421,271 | B2 * | 4/2013 | King | B60L 53/20 307/82 |
| 8,423,215 | B2 * | 4/2013 | Hermann | B60L 53/14 320/137 |
| 8,441,228 | B2 * | 5/2013 | Brabec | H02J 7/342 180/65.21 |
| 8,445,126 | B2 * | 5/2013 | Hermann | B60L 58/26 429/61 |
| 8,449,997 | B2 * | 5/2013 | Hermann | H01M 50/375 429/62 |
| 8,450,974 | B2 * | 5/2013 | Stewart | B60L 3/0061 320/132 |
| 8,471,521 | B2 * | 6/2013 | Stewart | H01M 10/30 320/132 |
| 8,541,905 | B2 * | 9/2013 | Brabec | B60L 53/00 320/116 |
| 8,564,241 | B2 * | 10/2013 | Masuda | H02J 7/007194 320/134 |
| 8,574,732 | B1 * | 11/2013 | Hermann | B60L 3/0061 429/61 |
| 8,575,897 | B2 * | 11/2013 | Masuda | H02J 7/0049 320/134 |
| 8,626,369 | B2 * | 1/2014 | Hermann | H01M 10/613 701/22 |
| 8,648,565 | B2 * | 2/2014 | Mitsutani | B60K 6/445 320/109 |
| 8,803,470 | B2 * | 8/2014 | Stewart | H01M 16/006 701/22 |
| 8,803,471 | B2 * | 8/2014 | Stewart | B60L 50/51 701/22 |
| 8,860,363 | B2 * | 10/2014 | Ang | B60L 1/02 320/132 |
| 8,928,272 | B2 * | 1/2015 | Song | B60L 53/11 320/109 |
| 8,928,290 | B2 * | 1/2015 | Bender | H02P 7/29 320/166 |
| 8,963,365 | B2 * | 2/2015 | King | B60L 58/20 307/64 |
| 8,963,482 | B2 * | 2/2015 | Ang | B60L 15/007 320/103 |
| 9,000,612 | B2 * | 4/2015 | Choi | H02J 3/381 307/64 |
| 9,024,573 | B2 * | 5/2015 | King | B60L 53/00 320/111 |
| 9,102,241 | B2 * | 8/2015 | Brabec | B60L 58/22 |
| 9,199,543 | B2 * | 12/2015 | Brabec | H02J 7/342 |
| 9,209,631 | B2 * | 12/2015 | Hermann | B60L 3/003 |
| 9,227,523 | B2 * | 1/2016 | King | B60L 53/56 |
| 9,238,415 | B2 * | 1/2016 | King | B60L 53/16 |
| 9,315,105 | B2 * | 4/2016 | Sakamoto | B60L 1/006 |
| 9,321,367 | B2 * | 4/2016 | King | H02J 7/342 |
| 9,331,499 | B2 * | 5/2016 | Ikriannikov | H02J 7/0014 |

(56) References Cited

U.S. PATENT DOCUMENTS

| | | | |
|---|---|---|---|
| 9,381,990 B2 * | 7/2016 | Settemsdal | B60L 7/16 |
| 9,431,840 B2 * | 8/2016 | Lee | H02M 3/1582 |
| 9,481,549 B2 * | 11/2016 | Ishiguro | B66B 1/302 |
| 9,487,090 B2 * | 11/2016 | Zhang | H02J 7/08 |
| 9,548,616 B2 * | 1/2017 | Hermann | B60L 53/65 |
| 9,559,532 B2 * | 1/2017 | Hermann | H01M 12/08 |
| 9,608,451 B2 * | 3/2017 | Sugeno | B60L 53/53 |
| 9,694,697 B2 * | 7/2017 | Brabec | H02M 3/1582 |
| 9,764,634 B2 * | 9/2017 | Dorsett | B60K 7/0007 |
| 9,764,655 B2 * | 9/2017 | Wu | B60L 58/21 |
| 9,768,639 B2 * | 9/2017 | Nakazawa | B60L 58/15 |
| 9,783,190 B2 * | 10/2017 | Ketfi-Cherif | B60L 50/16 |
| 9,809,121 B2 * | 11/2017 | King | B60L 53/18 |
| 9,834,406 B2 * | 12/2017 | Mezzadri | B66B 1/302 |
| 9,849,793 B2 * | 12/2017 | Tashiro | B60L 58/25 |
| 9,873,318 B2 * | 1/2018 | Dorsett | B60W 20/10 |
| 9,878,632 B2 * | 1/2018 | Zhou | B60L 50/90 |
| 9,889,751 B2 * | 2/2018 | Jang | H01M 10/46 |
| 9,975,439 B2 * | 5/2018 | King | B60L 53/56 |
| 9,994,117 B2 * | 6/2018 | Huff | B60K 1/00 |
| 10,011,184 B2 * | 7/2018 | Mitsutani | B60L 58/13 |
| 10,131,234 B2 * | 11/2018 | King | H02J 3/322 |
| 10,141,551 B2 * | 11/2018 | Choi | H02J 7/00306 |
| 10,196,019 B2 * | 2/2019 | Lopez De Arroyabe | B60L 53/80 |
| 10,205,334 B2 * | 2/2019 | Unno | B60L 58/24 |
| 10,252,884 B2 * | 4/2019 | Hu | B66B 5/04 |
| 10,286,804 B2 * | 5/2019 | Huff | B60L 55/00 |
| 10,377,225 B2 * | 8/2019 | Dorsett | B60W 20/10 |
| 10,377,250 B2 * | 8/2019 | Lee | B60L 53/22 |
| 10,449,849 B2 * | 10/2019 | Dorsett | B60K 6/30 |
| 10,461,553 B2 * | 10/2019 | Shimada | H02J 7/02 |
| 10,511,171 B2 * | 12/2019 | Kudo | B60L 53/20 |
| 10,541,541 B2 * | 1/2020 | Zhang | H02J 7/0014 |
| 10,604,023 B2 * | 3/2020 | King | B60L 53/20 |
| 10,611,256 B2 * | 4/2020 | Song | B60L 53/11 |
| 10,658,849 B2 * | 5/2020 | Syouda | H02J 7/0048 |
| 10,661,679 B2 * | 5/2020 | Botts | B60L 58/12 |
| 10,723,236 B2 * | 7/2020 | Tanaka | B60L 50/70 |
| 10,763,477 B2 * | 9/2020 | Hermann | H01M 16/00 |
| 10,763,754 B2 * | 9/2020 | Oouchi | H02J 7/0013 |
| 10,780,791 B2 * | 9/2020 | Nozawa | H02M 1/36 |
| 10,847,991 B2 * | 11/2020 | He | H02J 7/00 |
| 10,848,098 B2 * | 11/2020 | Agarwal | H01M 10/441 |
| 10,906,408 B2 * | 2/2021 | Song | H01M 10/44 |
| 10,933,751 B2 * | 3/2021 | Masui | H02J 7/0068 |
| 10,958,096 B2 * | 3/2021 | Hida | H02J 1/10 |
| 10,994,623 B2 * | 5/2021 | King | B60L 53/00 |
| 11,077,765 B2 * | 8/2021 | Takemoto | H02J 7/345 |
| 11,084,367 B2 * | 8/2021 | Dorsett | B60L 15/2018 |
| 11,155,153 B2 * | 10/2021 | Cafeo | H02J 7/00045 |
| 11,215,156 B2 * | 1/2022 | Ciaccio | H02J 7/342 |
| 11,258,280 B2 * | 2/2022 | Li | H01R 13/2421 |
| 11,260,848 B2 * | 3/2022 | Johri | B60W 20/50 |
| 11,292,452 B2 * | 4/2022 | Syed | B60W 10/08 |
| 11,332,030 B2 * | 5/2022 | Nishio | H02H 7/22 |
| 11,368,031 B2 * | 6/2022 | Qian | H02J 7/24 |
| 11,401,041 B2 * | 8/2022 | Baig | B64D 33/00 |
| 11,466,656 B2 * | 10/2022 | Ciaccio | B60L 1/02 |
| 11,491,883 B2 * | 11/2022 | Khaligh | H02M 7/797 |
| 11,527,947 B2 * | 12/2022 | Iwabuki | H02M 1/0048 |
| 11,667,213 B2 * | 6/2023 | Lennevi | B60L 1/00 307/149 |
| 11,745,619 B2 * | 9/2023 | Botts | H02J 7/0024 318/139 |
| 11,752,887 B2 * | 9/2023 | King | B60L 53/22 320/109 |
| 11,777,330 B2 * | 10/2023 | Justin | H02J 7/0071 320/162 |
| 11,784,501 B2 * | 10/2023 | Green | B60R 16/033 318/505 |
| 11,878,603 B2 * | 1/2024 | Isaksson | H02H 9/001 |
| 11,904,713 B2 * | 2/2024 | Hermann | H01M 10/32 |
| 11,993,489 B2 * | 5/2024 | Takao | B66B 1/3461 |
| 12,021,376 B2 * | 6/2024 | Hida | H02J 7/342 |
| 12,088,131 B2 * | 9/2024 | Herranz | H02J 7/02 |
| 12,206,328 B2 * | 1/2025 | Yoshida | H02J 7/0013 |
| 12,263,739 B2 * | 4/2025 | Hauck | H02J 1/082 |
| 2001/0017234 A1 * | 8/2001 | Suga | B66B 1/30 187/290 |
| 2001/0017237 A1 * | 8/2001 | Tominaga | H02P 23/06 187/290 |
| 2002/0053490 A1 * | 5/2002 | Banno | B66B 1/30 187/290 |
| 2002/0179376 A1 * | 12/2002 | Tominaga | B66B 1/30 187/290 |
| 2002/0189906 A1 * | 12/2002 | Tominaga | H02J 7/34 187/296 |
| 2003/0094923 A1 * | 5/2003 | Emori | B60L 58/15 320/126 |
| 2003/0094926 A1 * | 5/2003 | Emori | B60L 58/22 320/148 |
| 2003/0094928 A1 * | 5/2003 | Emori | H02J 7/0014 320/162 |
| 2004/0112320 A1 * | 6/2004 | Bolz | H02J 7/1423 290/31 |
| 2004/0160209 A1 * | 8/2004 | Emori | B60L 58/22 320/104 |
| 2004/0174140 A1 * | 9/2004 | Yang | H02J 7/342 320/116 |
| 2004/0222771 A1 * | 11/2004 | Iwata | F02N 11/087 320/134 |
| 2005/0017682 A1 * | 1/2005 | Canter | H02J 7/0048 320/118 |
| 2005/0083722 A1 * | 4/2005 | Emori | B60L 58/15 365/149 |
| 2006/0055367 A1 * | 3/2006 | Iwata | H02J 7/342 320/103 |
| 2008/0036419 A1 * | 2/2008 | Cook | H02J 7/0031 320/103 |
| 2008/0143292 A1 * | 6/2008 | Ward | B60L 8/003 320/101 |
| 2008/0197801 A1 * | 8/2008 | Manor | H02J 7/342 320/103 |
| 2008/0284370 A1 * | 11/2008 | Manor | H02J 7/342 320/137 |
| 2008/0308361 A1 * | 12/2008 | Nikovski | B66B 1/2458 187/385 |
| 2008/0316774 A1 * | 12/2008 | Ito | B60W 10/26 363/17 |
| 2009/0179612 A1 * | 7/2009 | Sherman | H02J 7/0013 320/114 |
| 2010/0085019 A1 * | 4/2010 | Masuda | H02J 7/0049 320/152 |
| 2010/0097031 A1 * | 4/2010 | King | B60L 53/14 320/109 |
| 2010/0156341 A1 * | 6/2010 | Sun | G06F 1/16 429/158 |
| 2010/0187045 A1 * | 7/2010 | Ishikawa | B66B 1/34 187/290 |
| 2010/0277117 A1 * | 11/2010 | Duan | H02M 3/1582 320/103 |
| 2011/0025124 A1 * | 2/2011 | Brabec | H02J 7/342 307/9.1 |
| 2011/0025125 A1 * | 2/2011 | Brabec | H02J 7/0071 307/9.1 |
| 2011/0025126 A1 * | 2/2011 | Brabec | H02M 3/1584 307/9.1 |
| 2011/0050174 A1 * | 3/2011 | King | B60L 53/20 320/134 |
| 2011/0101915 A1 * | 5/2011 | Mitsutani | B60L 53/305 320/109 |
| 2011/0133555 A1 * | 6/2011 | Choi | H02J 3/46 307/65 |
| 2011/0133694 A1 * | 6/2011 | Song | B60L 50/40 320/109 |
| 2011/0233931 A1 * | 9/2011 | Weber | F04B 17/03 290/1 R |
| 2011/0298414 A1 * | 12/2011 | Manor | H02J 7/342 320/128 |

(56) References Cited

U.S. PATENT DOCUMENTS

| | | | |
|---|---|---|---|
| 2012/0038314 A1* | 2/2012 | Stewart | B60L 3/0061 320/103 |
| 2012/0040210 A1* | 2/2012 | Hermann | B60L 53/14 429/9 |
| 2012/0040212 A1* | 2/2012 | Hermann | B60L 1/02 429/50 |
| 2012/0040255 A1* | 2/2012 | Hermann | B60L 53/65 429/407 |
| 2012/0041622 A1* | 2/2012 | Hermann | B60L 1/003 320/137 |
| 2012/0041623 A1* | 2/2012 | Hermann | B60L 53/65 320/137 |
| 2012/0041624 A1* | 2/2012 | Stewart | H02J 7/0029 903/903 |
| 2012/0043923 A1* | 2/2012 | Ikriannikov | H02J 7/0014 307/82 |
| 2012/0074774 A1* | 3/2012 | King | H02M 3/155 180/65.285 |
| 2012/0074894 A1* | 3/2012 | Chen | B60L 58/20 320/103 |
| 2012/0153878 A1* | 6/2012 | King | B60L 50/51 307/10.1 |
| 2012/0153879 A1* | 6/2012 | King | B60L 53/22 29/825 |
| 2012/0200263 A1* | 8/2012 | Masuda | H02J 7/0049 320/130 |
| 2013/0015823 A1* | 1/2013 | Hermann | B60L 58/20 320/137 |
| 2013/0038127 A1* | 2/2013 | King | B60L 58/20 307/64 |
| 2013/0038271 A1* | 2/2013 | Park | B60W 20/00 320/104 |
| 2013/0116889 A1* | 5/2013 | Zhang | H02J 7/1438 320/109 |
| 2013/0181511 A1* | 7/2013 | Stewart | H01M 10/486 307/9.1 |
| 2013/0187591 A1* | 7/2013 | Stewart | B60L 3/0061 320/104 |
| 2013/0200846 A1* | 8/2013 | Ang | B60L 1/003 320/109 |
| 2013/0221897 A1* | 8/2013 | Brabec | H02J 7/342 320/104 |
| 2013/0257375 A1* | 10/2013 | Ang | B60L 58/12 320/109 |
| 2013/0264865 A1* | 10/2013 | Sugeno | H02J 3/322 307/19 |
| 2013/0273444 A1* | 10/2013 | Hermann | H01M 50/253 429/407 |
| 2013/0307444 A1* | 11/2013 | Settemsdal | B60L 7/14 318/139 |
| 2013/0328531 A1* | 12/2013 | Hermann | B60L 1/02 320/137 |
| 2013/0334878 A1* | 12/2013 | Brabec | B60L 53/00 307/9.1 |
| 2014/0084875 A1* | 3/2014 | Bender | H02P 5/46 320/166 |
| 2014/0176046 A1* | 6/2014 | Park | H02J 7/00304 320/136 |
| 2014/0184140 A1* | 7/2014 | Lee | H02M 3/1582 320/103 |
| 2014/0238782 A1* | 8/2014 | Ishiguro | B66B 1/302 187/290 |
| 2014/0371968 A1* | 12/2014 | Sakamoto | B60L 50/16 701/22 |
| 2015/0084409 A1* | 3/2015 | Song | B60L 50/40 307/9.1 |
| 2015/0115709 A1* | 4/2015 | King | H02J 3/322 307/10.1 |
| 2015/0122589 A1* | 5/2015 | Mezzadri | B66B 1/302 187/290 |
| 2015/0137751 A1* | 5/2015 | King | B60L 50/51 320/109 |
| 2015/0214770 A1* | 7/2015 | Chen | H02J 7/0025 320/135 |
| 2015/0280487 A1* | 10/2015 | Nakazawa | B60L 58/20 320/101 |
| 2015/0283915 A1* | 10/2015 | Kim | B60L 50/72 320/104 |
| 2015/0298568 A1* | 10/2015 | Mitsutani | B60L 58/13 180/65.21 |
| 2016/0023571 A1* | 1/2016 | Wu | B60L 53/20 320/112 |
| 2016/0046195 A1* | 2/2016 | Jang | H02J 7/0068 320/103 |
| 2016/0052417 A1* | 2/2016 | Zhou | B60L 15/2045 701/22 |
| 2016/0145075 A1* | 5/2016 | Hanninen | B66B 1/34 187/289 |
| 2016/0214552 A1* | 7/2016 | Lopez De Arroyabe | B60L 15/04 |
| 2016/0236581 A1* | 8/2016 | Tashiro | B60L 7/14 |
| 2016/0264126 A1* | 9/2016 | Ketfi-Cherif | B60W 10/06 |
| 2016/0347163 A1* | 12/2016 | Dorsett | B60T 1/10 |
| 2016/0347167 A1* | 12/2016 | Dorsett | E21C 33/02 |
| 2016/0348336 A1* | 12/2016 | Dorsett | F16D 61/00 |
| 2017/0050528 A1* | 2/2017 | King | H02J 7/0013 |
| 2017/0054303 A1* | 2/2017 | Choi | H02J 7/007182 |
| 2017/0098940 A1* | 4/2017 | Syouda | H02J 7/0016 |
| 2017/0117731 A1* | 4/2017 | Shimada | H02M 3/33507 |
| 2017/0125760 A1* | 5/2017 | Hermann | B60L 53/65 |
| 2017/0232851 A1* | 8/2017 | Unno | B60L 7/14 307/10.1 |
| 2017/0283215 A1* | 10/2017 | Hu | B66B 5/04 |
| 2017/0305290 A1* | 10/2017 | Huff | B60K 1/00 |
| 2017/0341504 A1* | 11/2017 | Dorsett | B60K 7/0007 |
| 2017/0358987 A1* | 12/2017 | Oouchi | B60L 53/22 |
| 2017/0361718 A1* | 12/2017 | King | B60L 53/24 |
| 2018/0134170 A1* | 5/2018 | Zhou | B60L 58/21 |
| 2018/0141431 A1* | 5/2018 | Dorsett | H02K 7/025 |
| 2018/0167028 A1* | 6/2018 | Agarwal | H02S 40/38 |
| 2018/0205230 A1* | 7/2018 | Kudo | H02J 3/322 |
| 2018/0222336 A1* | 8/2018 | King | B60L 53/24 |
| 2018/0248385 A1* | 8/2018 | Zhang | H02M 3/01 |
| 2018/0252195 A1* | 9/2018 | Ciaccio | H01M 10/635 |
| 2018/0252774 A1* | 9/2018 | Ciaccio | G01R 31/388 |
| 2018/0264965 A1* | 9/2018 | Huff | B60K 1/00 |
| 2018/0323641 A1* | 11/2018 | Lee | H02J 7/0013 |
| 2018/0334037 A1* | 11/2018 | Masui | B60L 1/00 |
| 2018/0354374 A1* | 12/2018 | Lee | B60L 53/20 |
| 2019/0061544 A1* | 2/2019 | Jansen | B60L 53/14 |
| 2019/0135121 A1* | 5/2019 | Nozawa | H02M 3/158 |
| 2019/0260225 A1* | 8/2019 | Hida | H02M 3/158 |
| 2019/0267827 A1* | 8/2019 | He | H02J 7/342 |
| 2019/0337403 A1* | 11/2019 | Tanaka | H01M 8/04228 |
| 2019/0366830 A1* | 12/2019 | Cafeo | H02J 7/0013 |
| 2019/0366831 A1* | 12/2019 | Cafeo | H02J 7/0013 |
| 2020/0047604 A1* | 2/2020 | Dorsett | F16D 61/00 |
| 2020/0079231 A1* | 3/2020 | Song | H01M 10/443 |
| 2020/0130511 A1* | 4/2020 | Botts | B60L 58/22 |
| 2020/0169101 A1* | 5/2020 | Li | H02J 7/0048 |
| 2020/0180446 A1* | 6/2020 | King | B60L 50/51 |
| 2020/0212817 A1* | 7/2020 | Sun | H02M 1/083 |
| 2020/0247269 A1* | 8/2020 | Botts | B60L 58/21 |
| 2020/0269718 A1* | 8/2020 | Isaksson | B60L 3/0046 |
| 2020/0274375 A1* | 8/2020 | Griffiths | H02J 7/24 |
| 2020/0376971 A1* | 12/2020 | Takemoto | H02J 7/342 |
| 2020/0391723 A1* | 12/2020 | Syed | B60W 20/40 |
| 2020/0391725 A1* | 12/2020 | Johri | B60W 50/029 |
| 2020/0398683 A1* | 12/2020 | Hermann | H01M 16/00 |
| 2021/0016993 A1* | 1/2021 | Takao | B66B 1/3461 |
| 2021/0155100 A1* | 5/2021 | Khaligh | B60L 55/00 |
| 2021/0184491 A1* | 6/2021 | Hida | H02J 7/007182 |
| 2021/0213843 A1* | 7/2021 | Nishio | B60L 53/60 |
| 2021/0221240 A1* | 7/2021 | King | H02M 3/155 |
| 2021/0313870 A1* | 10/2021 | Iwabuki | H02M 1/007 |
| 2021/0394916 A1* | 12/2021 | Baig | H02J 7/345 |
| 2022/0029439 A1* | 1/2022 | Justin | H02J 7/0071 |
| 2022/0085641 A1* | 3/2022 | Hirota | B60L 50/60 |
| 2022/0101364 A1* | 3/2022 | Sakurada | G06Q 30/0224 |
| 2022/0131398 A1* | 4/2022 | Herranz | B60L 53/22 |

(56)          References Cited

U.S. PATENT DOCUMENTS

| | | | |
|---|---|---|---|
| 2022/0216790 A1* | 7/2022 | Yoshida | B60L 58/20 |
| 2022/0242275 A1* | 8/2022 | Lennevi | B60L 1/003 |
| 2022/0259008 A1* | 8/2022 | Nakagawa | B66B 7/00 |
| 2022/0285951 A1* | 9/2022 | Yoon | H02J 7/0019 |
| 2022/0332206 A1* | 10/2022 | Murthy-Bellur | B60L 53/50 |
| 2022/0337070 A1* | 10/2022 | Griffiths | B60R 16/033 |
| 2022/0371462 A1* | 11/2022 | Isaksson | B60L 53/11 |
| 2022/0410725 A1* | 12/2022 | Hauck | B60L 50/40 |
| 2023/0095625 A1* | 3/2023 | Chen | H02J 7/007182 |
| | | | 320/108 |
| 2023/0264894 A1* | 8/2023 | Hauck | B60L 58/20 |
| | | | 307/10.1 |
| 2024/0047982 A1* | 2/2024 | Green | B60R 16/033 |
| 2024/0146088 A1* | 5/2024 | Clark | H02J 7/02 |
| 2024/0208361 A1* | 6/2024 | Armstrong | B60L 53/66 |
| 2024/0258804 A1* | 8/2024 | Herranz | H02J 1/082 |
| 2024/0417217 A1* | 12/2024 | Hirabayashi | H02P 29/68 |

FOREIGN PATENT DOCUMENTS

| | | | | | |
|---|---|---|---|---|---|
| JP | 2013-49511 | A | | 3/2013 | |
| JP | 2016-145088 | A | | 8/2016 | |
| KR | 20110126003 | A | * | 11/2011 | B66B 1/3446 |

OTHER PUBLICATIONS

Office Action issued Jul. 15, 2024 in Korean Patent Application No. 10-2022-7032099, 11 pages.

Office Action issued Jan. 24, 2024 in Chinese Patent Application No. 202080098737.5, 15 pages.

International Search Report and Written Opinion mailed on Jun. 9, 2020, received for PCT Application PCT/JP2020/014474, filed on Mar. 30, 2020, 9 pages including English Translation.

Notice of Reasons for Refusal mailed on Oct. 27, 2020, received for JP Application 2020-548836, 5 pages Including English Translation.

* cited by examiner

FIG. 2

BATTERY 208          BATTERY 209

┌──────────┐
│          │·········T3
│          │·········T2
│          │
│          │·········T1
└──────────┘

┌──────────┐
│          │·········T3'
│          │·········T2'
│          │·········T1
└──────────┘

▨ REMAINING STORED POWER AMOUNT OF BATTERY 208
▧ REMAINING STORED POWER AMOUNT OF BATTERY 209

ELEVATOR WITH CAR HAVING TWO BATTERIES THAT CAN CHARGE EACH OTHER

CROSS-REFERENCE TO RELATED APPLICATION

The present application is based on PCT filing PCT/JP2020/014474, filed Mar. 30, 2020, the entire contents of which are incorporated herein by reference.

TECHNICAL FIELD

The present disclosure relates to an elevator including power storage units composed of batteries capable of storing and discharging power.

BACKGROUND ART

There is an elevator that eliminates the need for a power cable by supplying power to a car in a non-contact manner. In such an elevator, a battery constituting a power storage unit is provided to the car, and the elevator stores the power supplied in a non-contact manner, in the battery, and operates. For example, Patent Document 1 described below discloses an elevator in which a plurality of batteries connected to the same load are provided to a car. The elevator operates by using the power of the plurality of batteries while switching a battery that supplies power to the load.

CITATION LIST

PATENT DOCUMENT

Patent Document 1: Japanese Laid-Open Patent Publication No. 2016-145088

SUMMARY OF THE INVENTION

Problems to be Solved by the Invention

When the remaining stored power amount of the battery supplying power to the load decreases, the above elevator described in Patent Document 1 switches the battery that supplies power to the load, to another battery. However, when such power supply switching is performed, there is a possibility that the power to the load is temporarily interrupted. Such interruption of the power to the load leads to a decrease in service to passengers.

The present disclosure has been made to solve the above problem, and an object of the present disclosure is to provide an elevator capable of reducing a possibility that interruption of power to a load occurs, when a plurality of batteries are connected to the same load.

Solution to the Problems

An elevator according to the present disclosure includes: a car moving in a hoistway; a load provided to the car; a first power storage unit provided to the car, composed of one battery capable of charging and discharging, connected to the load, and supplying power to the load; a second power storage unit provided to the car, composed of one or more batteries capable of charging and discharging, and connected to the load to which the first power storage unit is connected; a power transmission circuit provided to the car and capable of transmitting power between the first power storage unit and the second power storage unit; and a control unit controlling the power transmission circuit to cause the power transmission circuit to supply power from the second power storage unit to the first power storage unit, when it is determined that a remaining stored power amount of the battery constituting the first power storage unit is less than an amount of power required for driving the load for a certain period of time.

Effect of the Invention

Even when the remaining stored power amount of the battery constituting the first power storage unit supplying power to the load decreases, the elevator according to the present disclosure can continue to operate, without power supply switching, by supplying power from the second power storage unit to the first power storage unit. Therefore, a possibility that interruption of power to the load occurs can be reduced.

BRIEF DESCRIPTION OF THE DRAWINGS

FIG. 2 is a block diagram of a circuit included in the elevator according to Embodiment 1 of the present disclosure.

DESCRIPTION OF EMBODIMENTS

Figure 1:
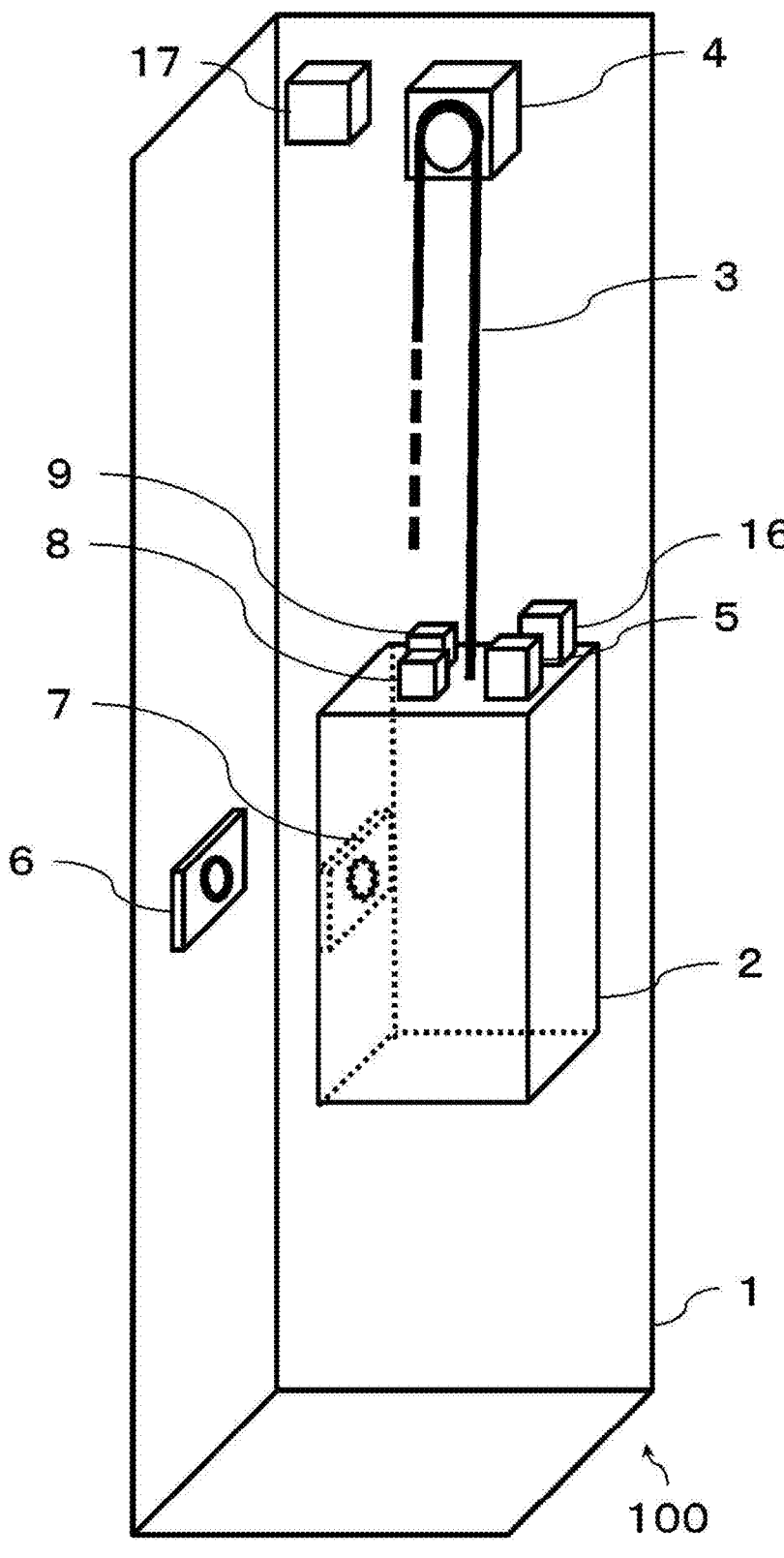
FIG. 1 is a perspective view of an elevator according to Embodiment 1 of the present disclosure.

Hereinafter, embodiments of the present disclosure will be described with reference to the drawings. In the drawings, the same reference characters denote the same or corresponding parts.

Embodiment 1

First, the configuration of an elevator 100 according to Embodiment 1 of the present disclosure will be described with reference to FIG. 1 to FIG. 3.

Figure 2:
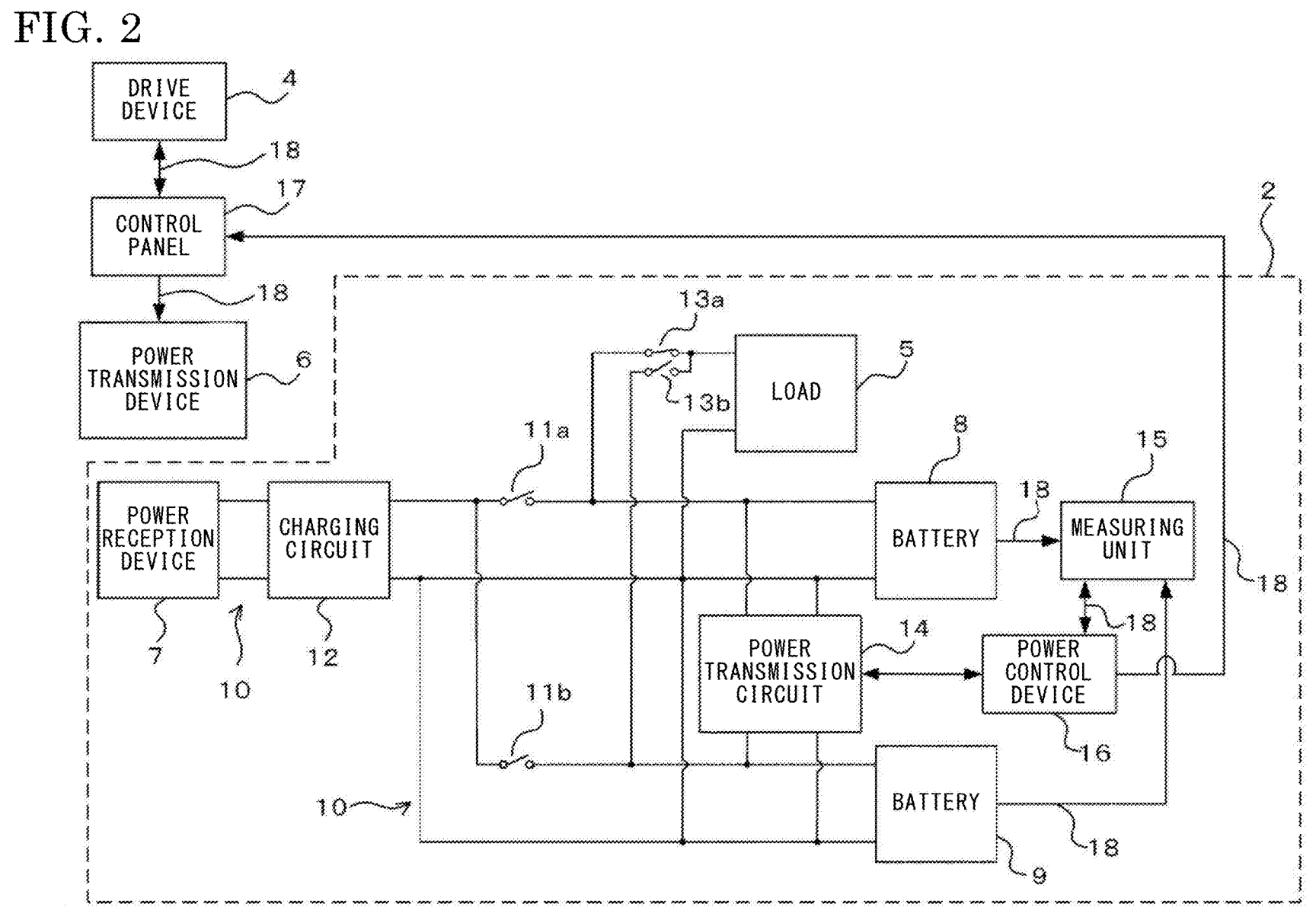

As shown in FIG. 1 and FIG. 2, the elevator 100 includes a hoistway 1, a car 2, a wire 3, a drive device 4, a load 5, a power transmission device 6, a power reception device 7, a battery 8, a battery 9, a conductive wire 10, a switch 11a, a switch 11b, a charging circuit 12, a switch 13a, a switch 13b, a power transmission circuit 14, a measuring unit 15, a power control device 16, a control panel 17, and a signal line 18.

As shown in FIG. 1, the hoistway 1 is a passage provided inside a building and extending in the vertical direction. The hoistway 1 is surrounded by hoistway walls in the vertical direction and in four directions orthogonal to the vertical direction. In FIG. 1, for facilitating the understanding, the hoistway wall on the front side is omitted.

Inside the hoistway 1, the car 2 for carrying passengers and transporting the passengers to each floor of the building is provided so as to be movable in the vertical direction along the hoistway 1. The car 2 is a housing having a space therein, and is provided with a door (not shown) at a part thereof, so that passengers can get on and off. In FIG. 1, for facilitating the understanding, a component located on the back side of the car 2 is shown by a dotted line.

The car 2 is connected to one end of the wire 3. The wire 3 extends from the one end, which is connected to the car 2, to the upper side of the hoistway 1, is turned back at an intermediate portion thereof, extends toward the lower side of the hoistway 1, and is connected at another end thereof to a counterweight (not shown). The intermediate portion of the wire 3 is supported by the drive device 4. The drive device 4 includes a motor and is installed at the upper side of the hoistway 1. The drive device 4 winds up the wire 3 to raise the car 2 and lower the counterweight or to conversely lower the car 2 and raise the counterweight, by rotating the motor. In FIG. 1, a part of the wire 3 extending from the drive device 4 to the counterweight is shown halfway, and the wire 3 is shown by a broken line in order to indicate that the wire 3 is omitted after this shown part.

The load 5 for controlling devices in the car 2 and providing services to passengers is provided to the car 2. When receiving power, the load 5 is driven and performs its function. In FIG. 1, the load 5 is provided on the ceiling of the car 2, but may be provided inside the car 2. Examples of the load 5 are an air conditioner, lighting, a door opening device for opening and closing the door, a display panel or an operation panel, and the like.

In the elevator 100, a power cable connected to the car 2 is eliminated, and the power required by the load 5 is supplied in a non-contact manner. In order to supply power in a non-contact manner, the power transmission device 6 is provided on the hoistway wall of the hoistway 1, and the power reception device 7 is provided to the car 2. The power transmission device 6 and the power reception device 7 each include a coil, and these coils are designed such that the resonance frequencies thereof coincide with each other. An AC power supply (not shown) is connected to the power transmission device 6, and when AC power adjusted to a frequency around the resonance frequency is supplied to the power transmission device 6, the power is transmitted to the coil of the power reception device 7 in a non-contact manner. The AC power supply, equipment related to the power supply, etc., may be provided on the hoistway wall, or may be disposed in a machine room or the like adjacent to the hoistway.

The power transmission device 6 is provided at one or more of stop floors at which the car 2 stops, and the power reception device 7 is provided on a side surface of the car 2. When the car 2 stops at the stop floor at which the power transmission device 6 is provided (hereinafter, referred to as a power supply floor), the coil of the power transmission device 6 and the coil of the power reception device 7 face each other, thereby enabling power transmission in a non-contact manner.

The battery 8 and the battery 9 which are capable of storing power transmitted in a non-contact manner and are capable of discharging power to be supplied to the load 5 are provided to the car 2. The battery 8 and the battery 9 are, for example, lithium ion batteries, and may be batteries that are capable of charging and discharging, such as lead storage batteries. As the battery 8 and the battery 9, the same ones such as ones having the same capacity for power to be stored are used.

As shown in FIG. 2, the battery 8 and the battery 9 are each connected to the power reception device 7 via the conductive wire 10 and the charging circuit 12 in order to receive, from the power reception device 7, the power transmitted in a non-contact manner. Specifically, the power reception device 7 and the charging circuit 12 are connected by the conductive wire 10, and the charging circuit 12 and the battery 8 are also connected by the conductive wire 10. The conductive wire 10 is branched between the charging circuit 12 and the battery 8, and the branched conductive wire 10 is connected to the battery 9.

The switch 11a and the switch 11b are provided on the conductive wire 10 such that a battery to be charged can be selected. The switch 11a and the switch 11b are provided between the branch point of the conductive wire 10 and the battery 8 and between the branch point of the conductive wire 10 and the battery 9, respectively. The switch 11a and the switch 11b are composed of, for example, relay switches.

The charging circuit 12 is for adjusting the difference in voltage between the power reception device 7 and the battery 8 or the battery 9, and is, for example, a step-up/down chopper circuit.

Moreover, the battery 8 is connected to the load 5 via the conductive wire 10 in order to supply power to the load 5. Similarly, the battery 9 is also connected to the load 5, to which the battery 8 is connected, via the conductive wire 10. Specifically, the conductive wire 10 is branched between the switch 11a and the battery 8, and the branched conductive wire 10 is connected to the load 5. In addition, the conductive wire 10 is branched between the switch 11b and the battery 9, and the branched conductive wire 10 is connected to the load 5. The switch 13a and the switch 13b are provided between the branched conductive wires 10 and the load 5, respectively, such that a battery that supplies power to the load 5 can be selected. The switch 13a and the switch 13b are composed of, for example, relay switches.

The power transmission circuit 14 which is a circuit capable of transmitting the power of the battery 8 to the battery 9 or the power of the battery 9 to the battery 8 is connected to the conductive wire 10. Specifically, the power transmission circuit 14 is connected between the branch point toward the load 5 and the conductive wire 10 between each battery. The power transmission circuit 14 is, for example, a bidirectional converter. When driven, the power transmission circuit 14 boosts a voltage such that the power of one battery can be stored in the other battery.

Moreover, the measuring unit 15 which measures current values used for calculating the remaining stored power amount of each battery is connected to the battery 8 and the battery 9. The measuring unit 15 includes a current detection circuit and a data collection device, and the current detection circuit detects a current outputted from each battery and a current inputted to each battery. In addition, the data collection device stores the current value outputted from the current detection circuit, and transmits the current value to the power control device 16. FIG. 2 shows a configuration in which the measuring unit 15 is connected to the battery 8 and the battery 9 by the signal line 18, in order to simplify the drawing. However, in reality, the current detection circuit included in the measuring unit 15 is provided on the conductive wire 10 between the positions at which the respective batteries and the power transmission circuit 14 are connected, and these circuits are connected to the data collection device of the measuring unit 15 by the signal line 18.

The power transmission circuit 14 and the measuring unit 15 are connected to the power control device 16 by the signal line 18. In addition, the power control device 16 is also connected to an operation panel inside the car 2 by the signal line 18 (not shown). The power control device 16 has a function of acquiring and integrating a current value of each of the battery 8 and the battery 9 measured by the measuring unit 15, at regular intervals, for example, every 1 ms, and calculating the remaining stored power amount of each of the battery 8 and the battery 9. In addition, the power control device 16 has a function of determining whether or not the remaining stored power amount of the battery 8 or the battery 9 is less than a predetermined first threshold value, by using the calculated remaining stored power amounts. Furthermore, the power control device 16 has a function of, when it is determined that the remaining stored power amount of the battery 8 or the battery 9 is less than the predetermined first threshold value, controlling the power transmission circuit 14 to cause the power transmission circuit 14 to supply power from one battery to the other battery.

In addition, the power control device 16 has a function of calculating predicted power consumption of the load 5. Moreover, the power control device 16 has a function of controlling ON-OFF of the switch 11a and the switch 11b and switching a battery to be charged at the power supply floor, and has a function of controlling ON-OFF of the switch 13a and the switch 13b and switching a battery that supplies power to the load 5.

The power transmission circuit 14, the measuring unit 15, and the power control device 16 described above are provided to the car 2.

The power control device 16 is connected to the control panel 17 by the signal line 18. In addition, the control panel 17 is also connected to the drive device 4, the power transmission device 6, and an operation panel (not shown) at each floor by the signal line 18. Furthermore, the control panel 17 has a function of controlling the movement of the car 2. Specifically, the control panel 17 has a function of controlling the drive device 4 to move the car 2 in order to, when the operation panel at each floor is operated, move the car 2 to the floor where the operation has been performed, and when the operation panel inside the car 2 is operated, move the car 2 to the floor for which an instruction has been made. Moreover, the control panel 17 has a function of transmitting a floor that is a movement destination (hereinafter, referred to as a destination floor), to the power control device 16 before moving the car 2. Furthermore, the control panel 17 has a function of driving the power transmission device 6 to charge the battery 8 or the battery 9 after receiving a power supply request signal from the power control device 16 and moving the car 2 to the power supply floor.

As described above, the power control device 16 mainly controls the devices inside the car 2, the control panel 17 controls the devices outside the car 2, and the power control device 16 and the control panel 17 cause the elevator 100 to function, by sending signals to each other. The power control device 16 and the control panel 17 are collectively referred to as a control unit.

Here, the hardware configurations of the power control device 16 and the control panel 17 constituting the control unit will be described with reference to FIG. 3.

The power control device 16 and the control panel 17 include a processor 161 and a processor 171, a memory 162 and a memory 172, an interface 163 and an interface 173, and a transmission line 164 and a transmission line 174, respectively.

In the memory 162 of the power control device 16, a program for calculating a remaining stored power amount, a program for determining whether or not the remaining stored power amount of the battery 8 or the battery 9 is less than the predetermined first threshold value, a program for controlling the power transmission circuit 14, a program for calculating predicted power consumption, a program for controlling the switch 11a, the switch 11b, the switch 13a, and the switch 13b, a program for setting a destination floor when the operation panel inside the car 2 is operated, etc., are stored. In addition, threshold values including the first threshold value are stored. The processor 161 of the power control device 16 reads and executes these programs from the memory 162. In addition, reception of signals transmitted from the measuring unit 15 and signals transmitted from the control panel 17 and transmission of signals to the power transmission circuit 14 and each switch are performed by the interface 163. The processor 161, the memory 162, and the interface 163 are connected to the transmission line 164, through which signals are transmitted inside the power control device 16, and exchange information therebetween.

In the memory 172 of the control panel 17, a program for setting a destination floor when the operation panel at each floor is operated, a program for driving the drive device 4, a program for driving the power transmission device 6, etc., are stored. The processor 171 of the control panel 17 reads and executes these programs from the memory 172. In addition, reception of signals transmitted from the operation panel at each floor and signals transmitted from the power control device 16 and transmission of signals to the power transmission device 6 are performed by the interface 173. The processor 171, the memory 172, and the interface 173 are connected to the transmission line 174, through which signals are transmitted inside the control panel 17, and exchange information therebetween.

Figure 3:
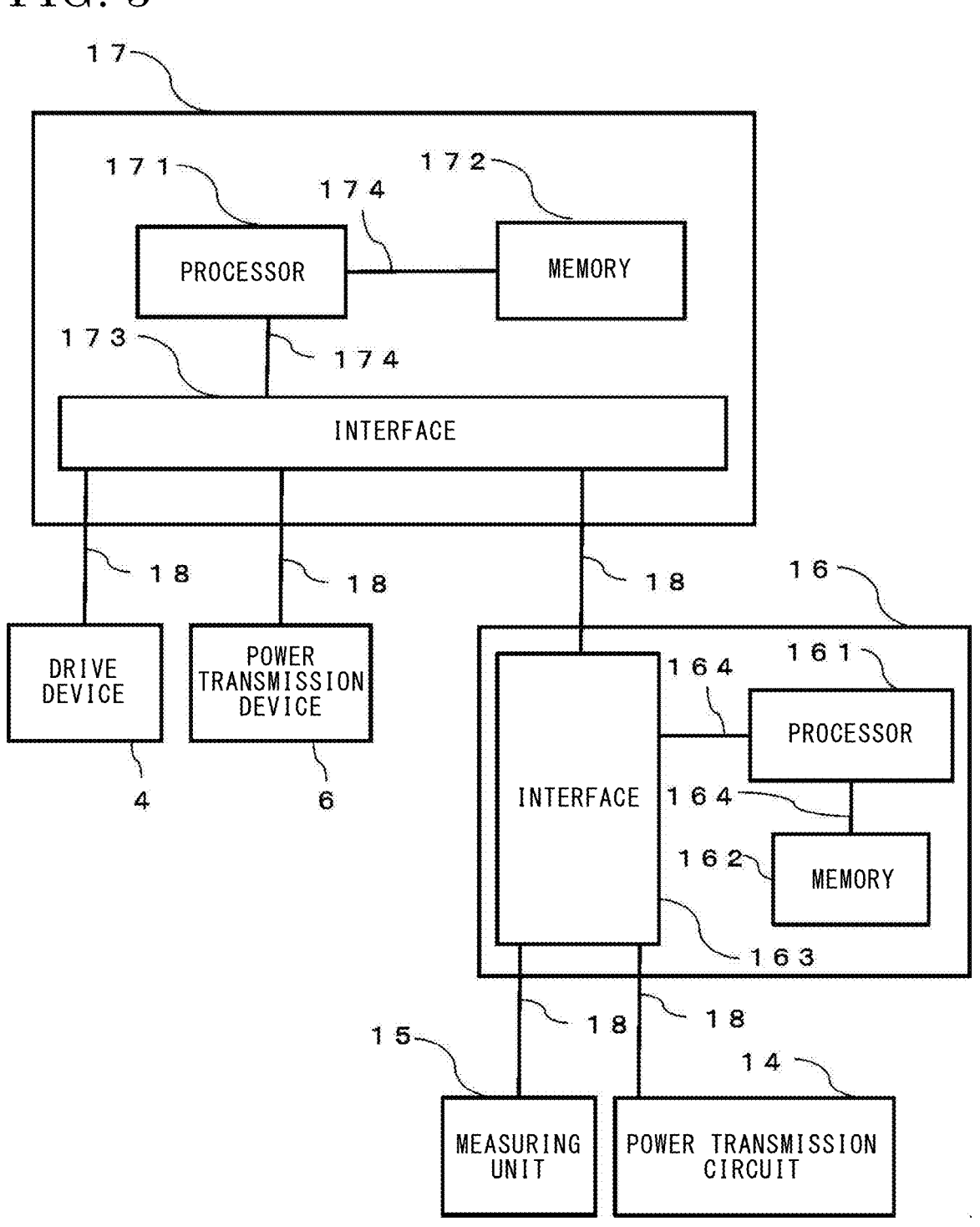
FIG. 3 is a block diagram showing the hardware configuration of a control unit of the elevator according to Embodiment 1 of the present disclosure.

As shown in FIG. 2 and FIG. 3, the drive device 4 and the control panel 17, the power transmission device 6 and the control panel 17, the power transmission circuit 14 and the power control device 16, the measuring unit 15 and the power control device 16, and the power control device 16 and the control panel 17 are connected by the signal line 18, respectively, and can perform transmission and reception of signals therebetween. As the signal line 18, a known signal line that conforms to the standards of signals transmitted and received by each device may be used. In the case where wireless communication is performed between each device, a wireless communication device may be installed in each device to transmit and receive signals without connection by the signal line 18.

The configuration of the elevator 100 has been described above. Next, the operation of the elevator 100 will be described with reference to FIG. 4 to FIG. 9.

Figure 4:
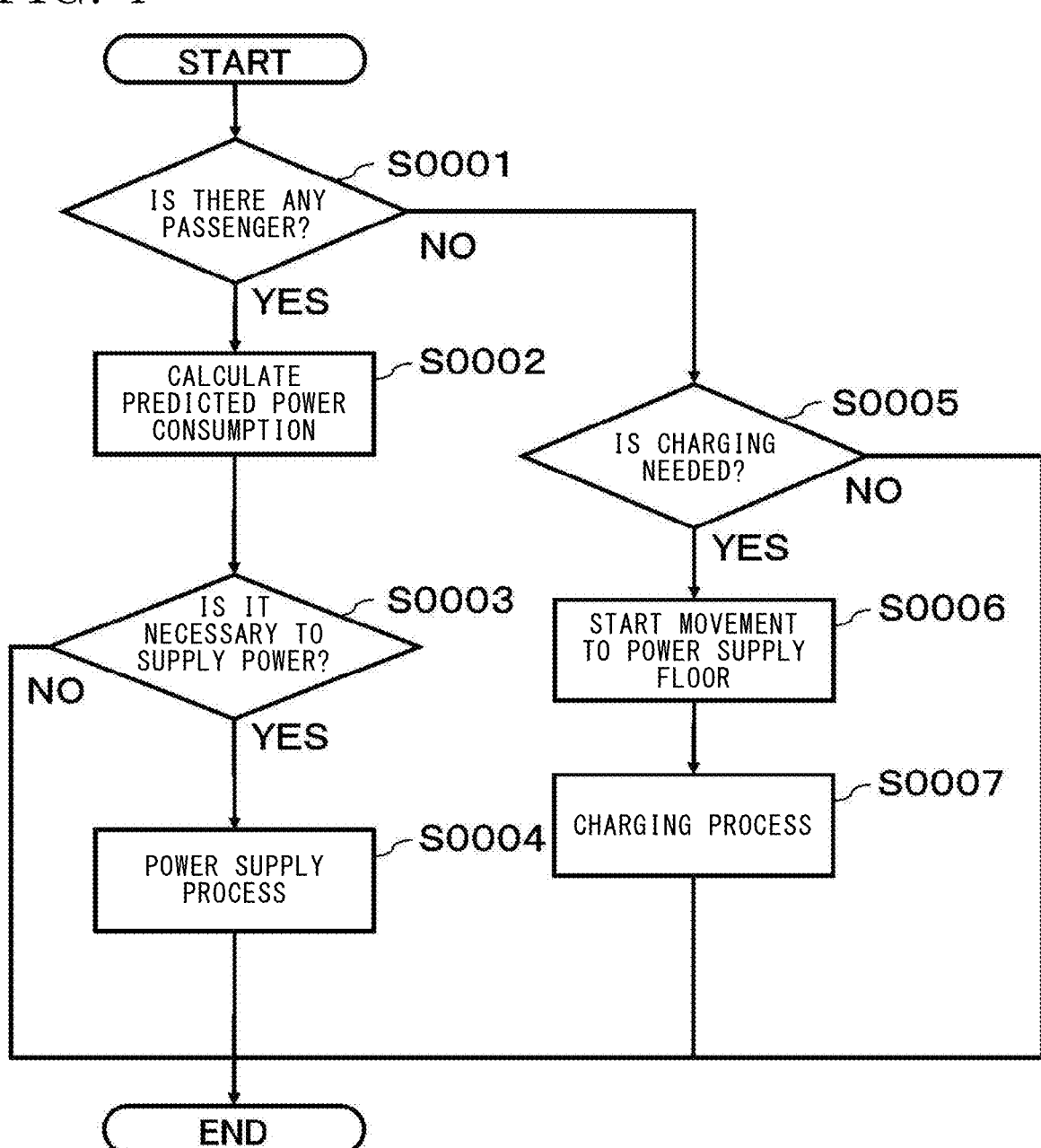
FIG. 4 is a flowchart showing operation during discharging and during charging of the elevator according to Embodiment 1 of the present disclosure.

FIG. 4 is a flowchart showing a process performed by the control unit when the elevator 100 is operating. The process of the flowchart is started when the operation panel inside the car 2 is operated. In addition, even if the operation panel inside the car 2 is not operated, the process of the flowchart is started when a certain period of time, for example, 5 seconds elapses from the time when the door is closed last. These conditions for starting the process are referred to as a start condition.

First, the power control device 16 determines whether or not there is any passenger inside the car 2 (step S0001).

Specifically, the processor 161 of the power control device 16 searches for whether information of a destination floor is stored in the memory 162. When information of a destination floor transmitted from the operation panel inside the car 2 is stored, the processor 161 determines that there is a passenger inside the car 2. When the operation panel inside the car 2 is operated, the operation panel transmits a destination floor signal to the power control device 16, and the memory 162 stores therein information of a destination floor indicated by the destination floor signal. When the car 2 arrives at the destination floor, the control panel 17 transmits an arrival signal to the power control device 16, and the processor 161 of the power control device 16 updates the information of the destination floor as information of the present stop floor.

Then, when the power control device 16 determines that there is a passenger inside the car 2 (YES in step S0001), the power control device 16 calculates predicted power consumption that is a predicted value of power consumption required by the load 5 for moving from the present stop floor to the destination floor until opening the door (step S0002). When a plurality of passengers are present and there are a plurality of destination floors, the destination floor is the destination floor at which arrival is finally made.

Specifically, in the memory 162 of the power control device 16, the present stop floor, the destination floor, and the movement time required for movement to each floor to which movement is made (time from the start of movement to the completion of door opening) are stored, and the processor 161 of the power control device 16 reads the information of the present stop floor and the destination floor from the memory 162. Then, the processor 161 performs subtraction between the floor number of the present stop floor and the floor number of the destination floor, and reads the movement time associated with the floor number corresponding to the absolute value of the difference therebetween, from the memory 162. This time is the time required for moving the car 2 to the destination floor and opening the door. When the processor 161 determines from the information of the destination floor that the car 2 will stop at another destination floor before arriving at the destination floor at which the car 2 finally arrives, the processor 161 reads the time for slowing down the car 2 and opening the door at the other destination floor, from the memory 162, and adds the read time to the above time required for moving the car 2 to the destination floor and opening the door, to correct the above time.

Moreover, the measuring unit 15 measures the current values of the battery 8 and the battery 9 at regular intervals, for example, every 1 ms, and transmits the current values to the power control device 16. The memory 162 of the power control device 16 stores therein the current values transmitted by the measuring unit 15, together with the reception time and information indicating whether the battery is the battery 8 or the battery 9, and for each battery, the processor 161 of the power control device 16 calculates the present remaining stored power amount of each of the battery 8 and the battery 9 by reading and integrating the current values after the time when the battery is fully charged last time, among the stored current values, and subtracting the resulting value from the remaining stored power amount in a fully charged condition. The remaining stored power amount in a fully charged condition is stored in the memory 162 when the elevator 100 is installed or maintained, and is equal to a third threshold value described later. The time when the battery is fully charged last time is the time that is stored in the memory 162 by the processor 161 of the power control device 16 when the battery is fully charged last time (when the battery is charged until exceeding the third threshold value described later).

Moreover, for each battery, the processor 161 of the power control device 16 calculates the remaining stored power amount at a past time of each of the battery 8 and the battery 9 by reading and integrating current values that are the current values after the time when the battery is fully charged last time and until the intermediate time between the time when the battery is fully charged last time and the present time, and subtracting the resulting value from the remaining stored power amount in a fully charged condition. Then, the processor 161 calculates an amount of change in the remaining stored power amount by subtracting the total value of the past remaining stored power amounts of the battery 8 and the battery 9 from the total value of the present remaining stored power amounts of the battery 8 and the battery 9, and calculates an amount of change in the remaining stored power amount per unit time by dividing the above amount of change by the elapsed time from the intermediate time to the present time. The amount of change in the remaining stored power amount per unit time is equal to the past power consumption per unit time of the load 5.

Then, the processor 161 of the power control device 16 calculates predicted power consumption by multiplying the calculated power consumption per unit time by the time required for movement. In addition, the processor 161 stores the calculated predicted power consumption and the movement time to the destination floor in the memory 162.

Next, the power control device 16 subtracts the predicted power consumption from the present remaining stored power amount of the battery that is presently supplying power to the load 5, to calculate a predicted value of the remaining stored power amount of this battery when movement to the destination floor is made and the door is opened, and determines whether the calculated predicted value of the remaining stored power amount is less than the first threshold value (step S0003). When the calculated predicted value is less than the first threshold value, the power control device 16 determines that it is necessary to supply power, and when the calculated predicted value is not less than the first threshold value, the power control device 16 determines that it is not necessary to supply power.

Here, the process performed in step S0003 will be described with reference to FIGS. 5A to 5C. In the following description, the battery that is presently supplying power to the load 5 is referred to as a first power storage unit, and the battery that is not supplying power to the load 5 is referred to as a second power storage unit. When the battery 8 is supplying power to the load 5, the battery 8 constitutes the first power storage unit, and the battery 9 constitutes the second power storage unit. When switching of ON-OFF of the switch 13a and the switch 13b (FIG. 2) is performed, the battery 9 constitutes the first power storage unit, and the battery 8 constitutes the second power storage unit.

Figure 5A:
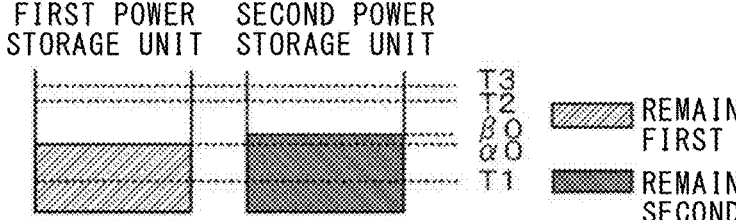
FIGS. 5A to 5C are conceptual diagrams showing the remaining stored power amounts of power storage units in the elevator according to Embodiment 1 of the present disclosure.
Figure 5B:
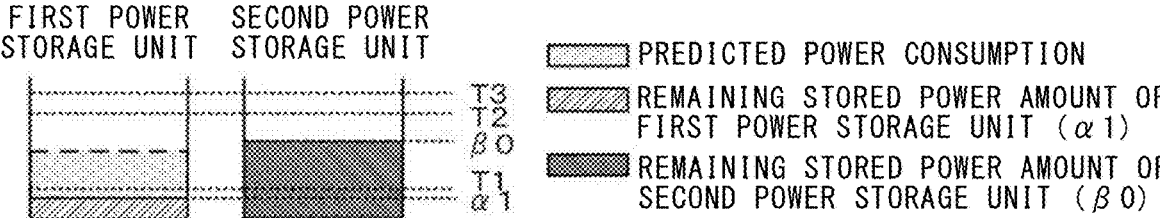
Figure 5C:
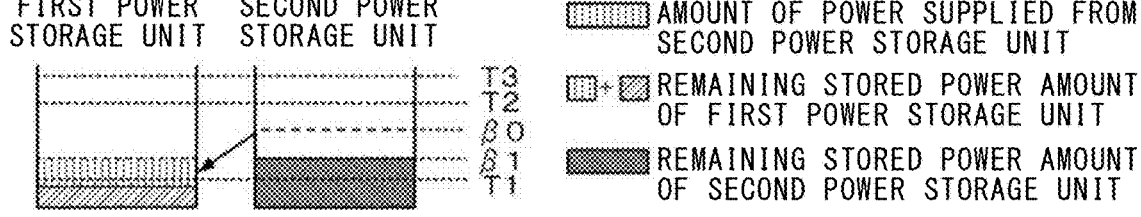

FIGS. 5A to 5C are conceptual diagrams showing the remaining stored power amounts of the first power storage unit and the second power storage unit. FIG. 5A shows an example of the present remaining stored power amounts of the first power storage unit and the second power storage unit, the remaining stored power amount of the first power storage unit is $\alpha 0$, and the remaining stored power amount of the second power storage unit is $\beta 0$. T1 denotes the first threshold value.

The processor 161 of the power control device 16 subtracts the predicted power consumption from the present remaining stored power amount in the first power storage unit which is calculated in step S0002. Giving a description with reference to FIG. 5B, although the remaining stored power amount of the first power storage unit is $\alpha 0$, when the predicted power consumption is subtracted therefrom, the remaining stored power amount is decreased as shown in the drawing, and the remaining stored power amount predicted after movement is $\alpha 1$.

Then, the processor 161 of the power control device 16 determines whether the remaining stored power amount $\alpha 1$, of the battery constituting the first power storage unit, predicted after movement is less than the first threshold value T1 read from the memory 162, and determines whether or not it is necessary to supply power. Here, the first threshold value T1 is a value indicating the amount of power required for driving the load 5 for a certain period of time, and the certain period of time is, for example, the time required for moving passengers to the nearest stop floor (floor immediately above or below the present floor) and unloading the passengers in case of an emergency such as an outage.

Figure 6:
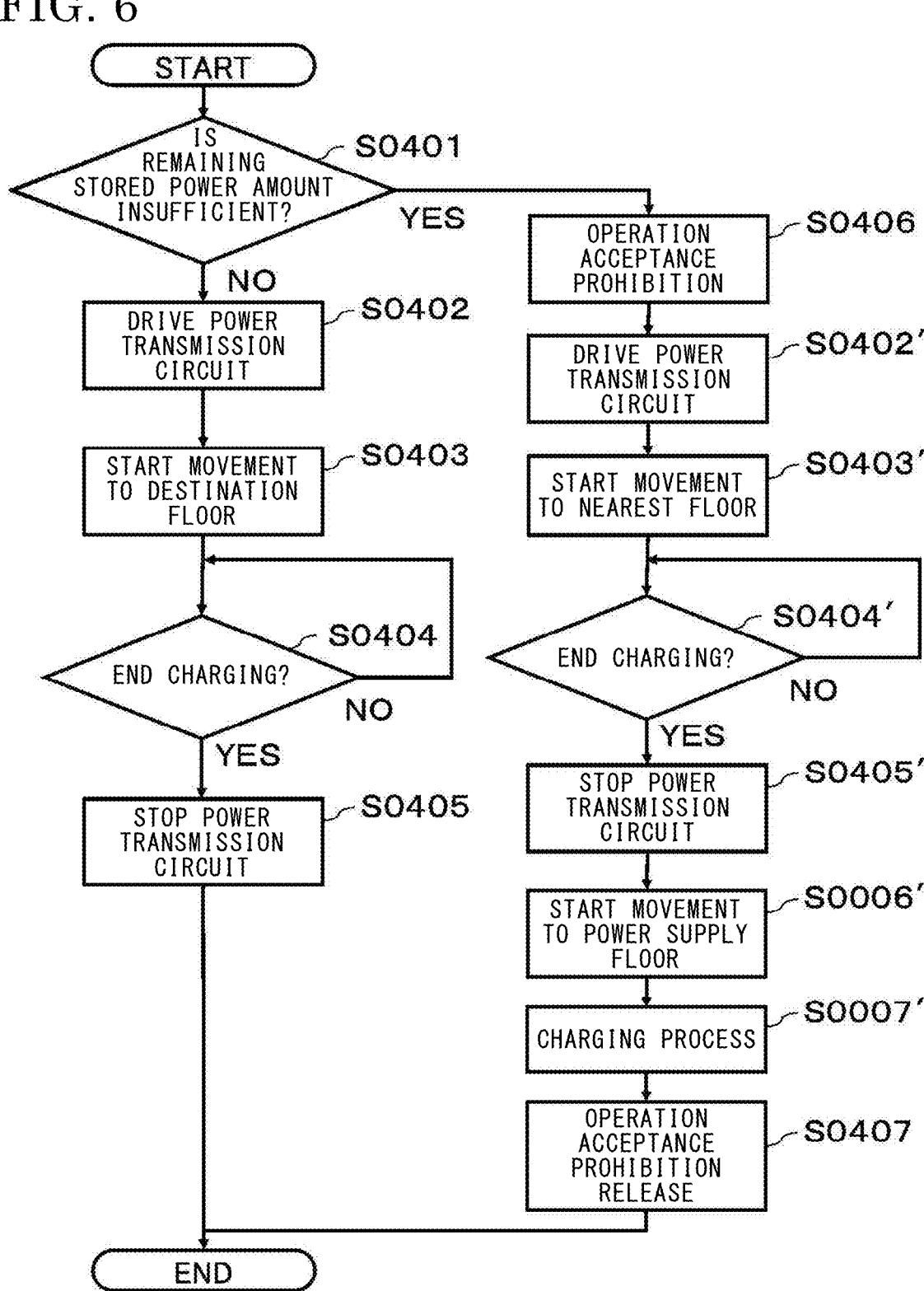
FIG. 6 is a flowchart showing operation in a power supply process of the elevator according to Embodiment 1 of the present disclosure.

As shown in FIG. 4, when the power control device 16 determines that it is necessary to supply power (YES in step S0003), the power control device 16 performs a power supply process (step S0004). This process is a process for increasing the remaining stored power amount of the battery constituting the first power storage unit, and continuously supplying power to the load 5 without switching the switch 13a and the switch 13b, and is a process of supplying power from the second power storage unit to the first power storage unit. By performing this process, occurrence of a situation in which the power storage unit that supplies power to the load 5 has to be switched due to an excessive decrease in the power of the first power storage unit is suppressed. The power supply process is shown in FIG. 6, and will be described in detail later.

The process of the flowchart in FIG. 4 is ended when the power supply process is completed, and is started again when the start condition is satisfied.

Moreover, the process of the flowchart in FIG. 4 is also ended when the power control device 16 determines that it is not necessary to supply power (NO in step S0003), and is started again when the start condition is satisfied.

Next, the case where it is determined in step S0001 in FIG. 4 that there is no passenger inside the car 2 (NO in step S0001) will be described.

When there is no passenger, the power control device 16 determines whether at least either the first power storage unit or the second power storage unit needs to be charged (step S0005).

Specifically, for each battery, the processor 161 of the power control device 16 calculates the present remaining stored power amount of each of the batteries constituting the first power storage unit and the second power storage unit, by reading and integrating the current values after the time when the battery is fully charged last time, among the stored current values, and subtracting the resulting value from the remaining stored power amount in a fully charged condition. This process of calculating the present remaining stored power amount is the same as that in step S0002. Furthermore, the processor 161 reads a second threshold value from the memory 162 and determines whether or not any of the remaining stored power amounts is less than the second threshold value. When any of the remaining stored power amounts is less than the second threshold value, the processor 161 determines that the first power storage unit or the second power storage unit needs to be charged. On the other hand, when all the remaining stored power amounts are not less than the second threshold value, the processor 161 determines that charging is not needed. The second threshold value is a threshold value for determining whether any power storage unit needs to be charged, and is larger than the first threshold value. In FIG. 5, the second threshold value is denoted by T2.

When it is determined that at least either the first power storage unit or the second power storage unit needs to be charged (YES in step S0005), the control panel 17 starts the movement of the car 2 to the power supply floor (step S0006).

Specifically, the processor 161 of the power control device 16 transmits a power supply request signal to the control panel 17. The processor 171 of the control panel 17 having received the power supply request signal controls the drive device 4 to start the movement of the car 2 to the power supply floor.

Figure 7:
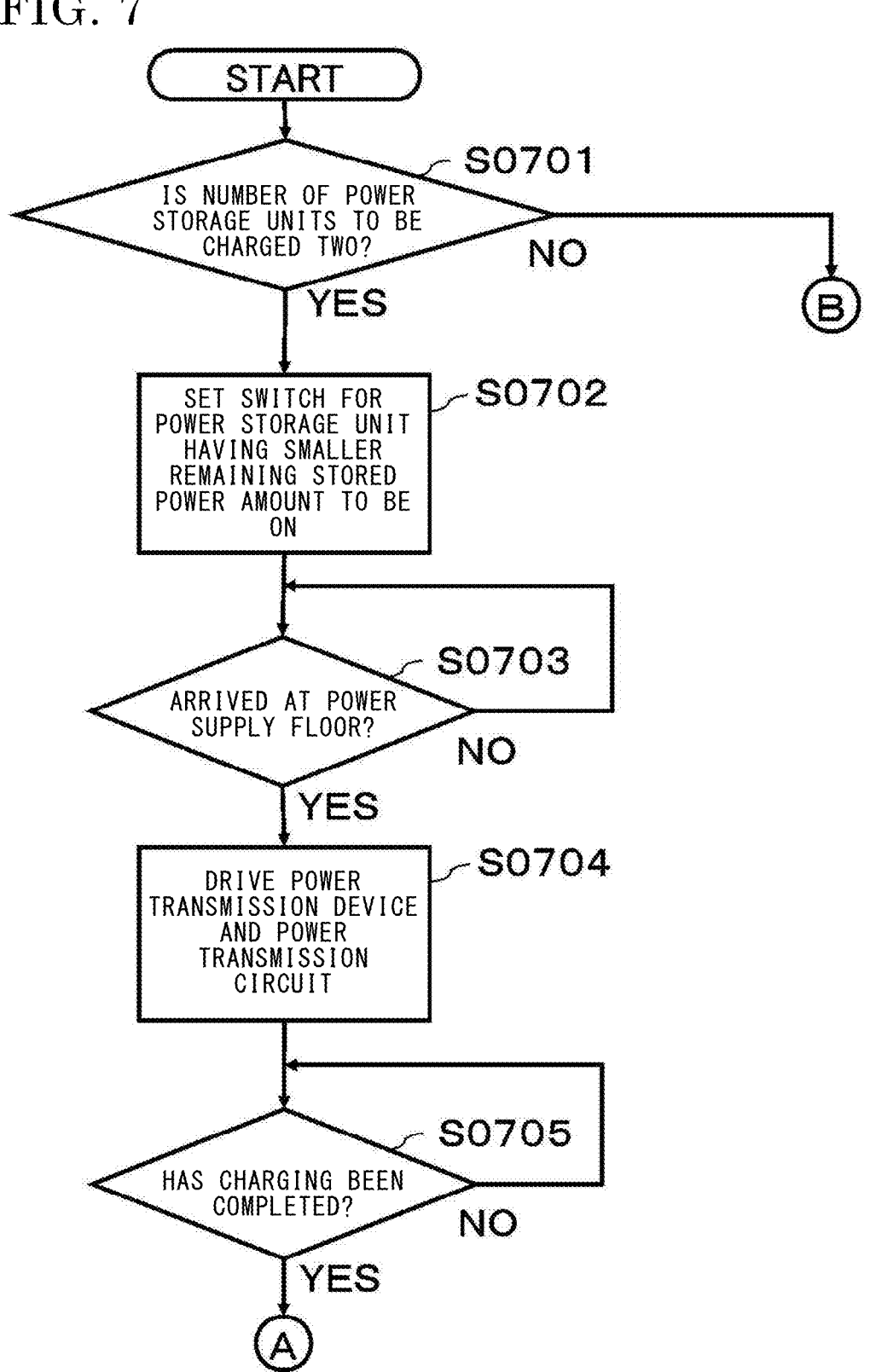
FIG. 7 is a flowchart showing operation in a charging process of the elevator according to Embodiment 1 of the present disclosure.
Figure 8:
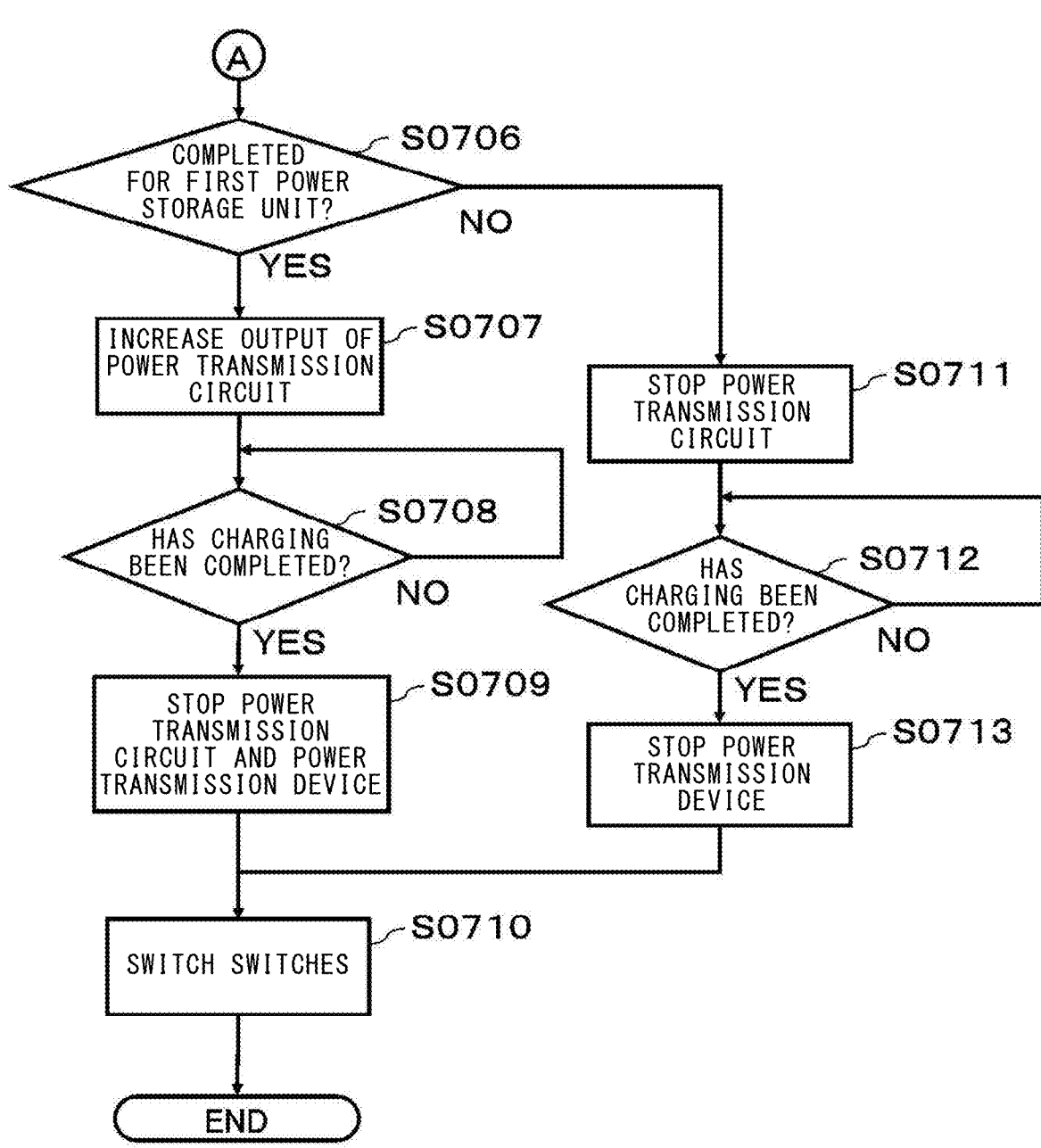
FIG. 8 is a flowchart showing the operation in the charging process of the elevator according to Embodiment 1 of the present disclosure.
Figure 9:
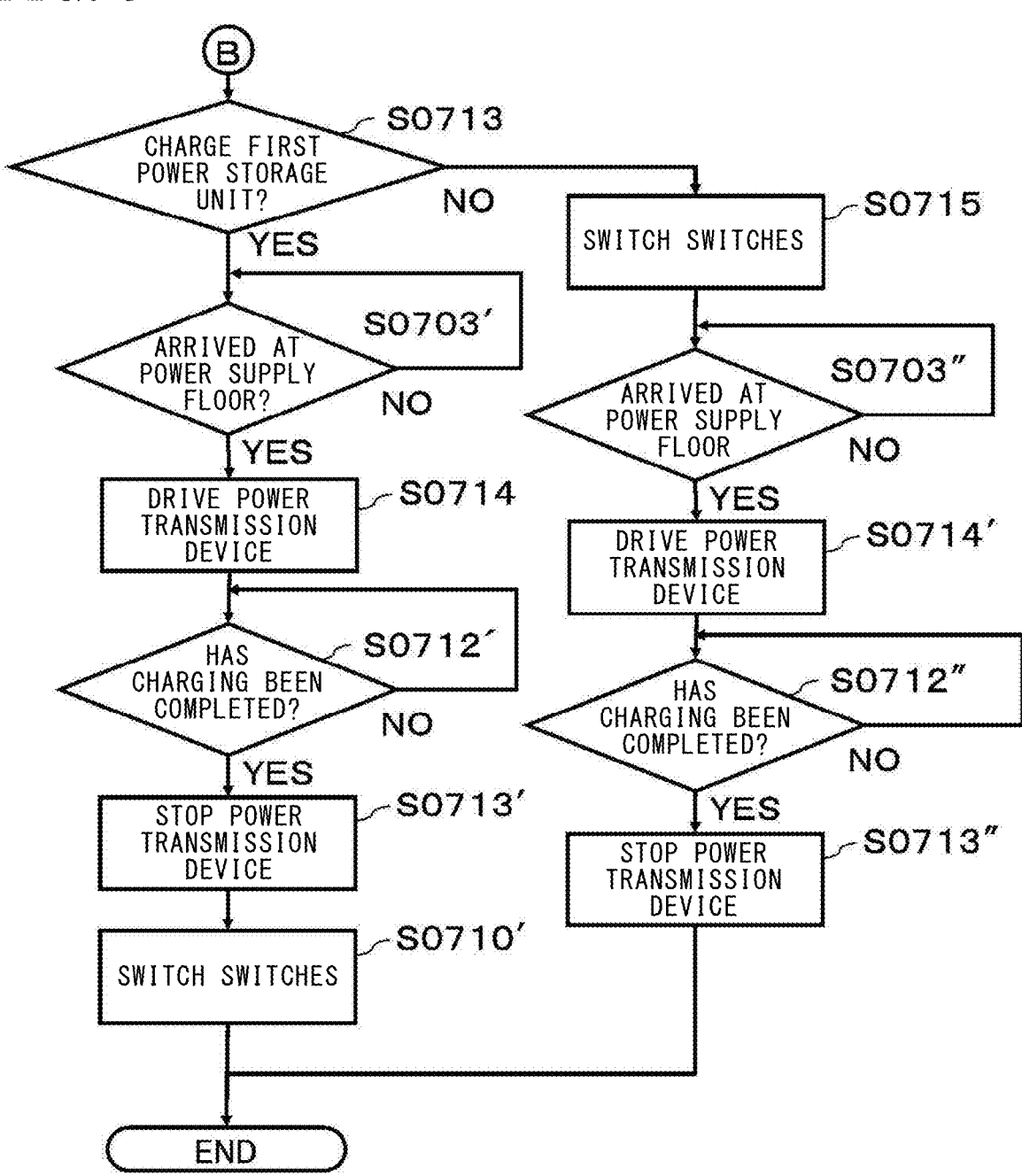
FIG. 9 is a flowchart showing the operation in the charging process of the elevator according to Embodiment 1 of the present disclosure.

Then, the power control device 16 and the control panel 17 perform a charging process (step S0007). This process is a process of supplying power to the battery that needs to be charged, in a non-contact manner at the power supply floor to charge the battery. This process is shown in FIG. 7 to FIG. 9, and will be described in detail later.

The process of the flowchart in FIG. 4 is ended when the charging process is completed, and is started again when the start condition is satisfied.

Moreover, the process of the flowchart in FIG. 4 is also ended when the power control device 16 determines that charging is not needed (No in step S0005), and is started again when the start condition is satisfied.

Next, the power supply process (step S0004) included in the flowchart in FIG. 4 will be described in detail with reference to FIG. 6. This process is a process performed when there is any passenger inside the car 2 as described above, and is for suppressing interruption of power to the load due to switching of the switches, by supplying power from the second power storage unit to the first power storage unit which supplies power to the load 5.

First, the power control device 16 determines whether the respective remaining stored power amounts of the batteries constituting the first power storage unit and the second power storage unit exceed the first threshold value after the movement to the destination floor as a result of supplying power from the second power storage unit to the first power storage unit (step S0401). When both of the remaining stored power amounts of the first power storage unit and the second power storage unit exceed the first threshold value, both power storage units can drive the load 5 for the certain period of time, so that the redundant configuration can be maintained even after the movement to the destination floor. Therefore, it is determined that the remaining stored power amount is not insufficient. On the other hand, when the remaining stored power amount of the battery constituting the first power storage unit or the second power storage unit does not exceed the first threshold value, at least one power storage unit cannot drive the load 5 for the certain period of time, so that the redundant configuration cannot be maintained after the movement to the destination floor. Therefore, it is determined that the remaining stored power amount is insufficient.

Specifically, the processor 161 of the power control device 16 reads the respective present remaining stored power amounts of the batteries constituting the first power storage unit and the second power storage unit, from the memory 162, and calculates the average value of these remaining stored power amounts. This average value is an arithmetic average value. The present remaining stored power amounts read here are the amounts calculated in step S0002 in FIG. 4. Then, the processor 161 subtracts the value obtained by dividing the predicted power consumption calculated in step S0002 by the number of batteries, from the average value of the remaining stored power amounts, to calculate the average value of the remaining stored power amounts after the movement to the destination floor. Furthermore, the processor 161 reads the first threshold value from the memory 162 and determines whether the average value of the remaining stored power amounts after the movement exceeds the first threshold value. The average value of the remaining stored power amounts after the movement to the destination floor which is calculated here is stored in the memory 162.

The total value of the remaining stored power amounts of the respective batteries may be compared with the value obtained by multiplying the first threshold value by the number of batteries. However, such a calculation is equivalent to the above calculation using the average value, and as a result, the comparison is equivalent to determining whether the average value of the remaining stored power amounts exceeds the first threshold value.

When the average value of the remaining stored power amounts of the batteries constituting the first power storage unit and the second power storage unit after the movement to the destination floor exceeds the first threshold value (YES in step S0401), the power control device 16 drives and controls the power transmission circuit 14 to cause the power transmission circuit 14 to supply power from the second power storage unit that is not supplying power to the load 5, to the first power storage unit to charge the first power storage unit (step S0402).

Specifically, the processor 161 of the power control device 16 transmits a signal for driving and controlling the power transmission circuit 14, to the power transmission circuit 14, and the power transmission circuit 14 adjusts the voltage and transmits power from the second power storage unit to the first power storage unit. The amount of power transmitted by the power transmission circuit 14 to the first power storage unit per unit time is calculated based on the present remaining stored power amount of the battery constituting the second power storage unit, the average value after the movement, and the movement time to the destination floor. The processor 161 reads the present remaining stored power amount of the battery constituting the second power storage unit, the average value after the movement, and the movement time to the destination floor, from memory 162, divides the value obtained by subtracting the average value after the movement from the present remaining stored power amount, by the movement time to calculate the amount of power to be transmitted per unit time, and controls the power transmission circuit 14 to supply power in this amount of power per unit time. In the power supply process, power is supplied until the remaining stored power amount of the battery constituting the second power storage unit reaches the average value after the movement (step S0404 described later), so that, with the above configuration, it is possible to complete charging of the first power storage unit before the car 2 arrives at the destination floor.

Then, the control panel 17 drives the drive device 4 to start the movement of the car 2 to the destination floor (step S0403).

Specifically, the processor 161 of the power control device 16 reads the information of the destination floor stored in the memory 162, and transmits the information as a destination floor signal to the control panel 17. The control panel 17 having received the destination floor signal controls the drive device 4 to move the car 2 to the destination floor.

While the car 2 is moving, the power control device 16 determines whether or not to end the charging of the first power storage unit by supply of power (step S0404). Whether or not the charging has been completed is determined based on whether or not the remaining stored power amount of the battery constituting the second power storage unit which supplies power is equal to the average value of the remaining stored power amounts after the movement to the destination floor which is calculated in step S0401.

Specifically, for the second power storage unit, the processor 161 of the power control device 16 calculates the present remaining stored power amount of the battery constituting the second power storage unit, by reading and integrating the current values after the time when the battery is fully charged last time, among the stored current values, and subtracting the resulting value from the remaining stored power amount in a fully charged condition. Then, the processor 161 reads the average value of the remaining stored power amounts after the movement to the destination floor which is stored in the memory 162, and determines whether the remaining stored power amount of the second power storage unit is equal to the average value. When the remaining stored power amount of the second power storage unit is not equal to the average value, the processor 161 repeats this process. When the remaining stored power amount of the second power storage unit is equal to the average value, the processor 161 determines to end the charging. The remaining stored power amount being equal to the average value does not have to mean that the remaining stored power amount is exactly equal to the average value, and there may be a slight difference therebetween. There is no problem if the difference is such a difference that the remaining stored power amount of the battery constituting the second power storage unit does not become less than the first threshold value in the cycle of the determination in step S0404.

By performing such supply of power, the amount of power supplied from the second power storage unit to the first power storage unit is as shown in FIG. 5C. Since the second power storage unit supplies power to the first power storage unit, the remaining stored power amount of the second power storage unit decreases from $\beta 0$ to $\beta 1$, $\beta 1$ is equal to the average value of the remaining stored power amount after the movement, and this average value is larger than the first threshold value T1. Therefore, the remaining stored power amount of the battery constituting the second power storage unit does not decrease to be lower than the first threshold value T1. In addition, unless power is supplied to the first power storage unit, the remaining stored power amount of the first power storage unit becomes less than the first threshold value T1. However, by supplying power from the second power storage unit to the first power storage unit, the remaining stored power amount of the first power storage unit can be maintained above the first threshold value T1 even when the first power storage unit supplies power to the load 5.

When the power control device 16 determines to end the charging of the first power storage unit by supply of power (YES in step S0404), the power control device 16 stops the power transmission circuit 14 (step S0405) and ends the power supply process.

Specifically, the processor 161 of the power control device 16 transmits a signal for stopping the power transmission circuit 14, to the power transmission circuit 14 to stop the power transmission circuit 14.

Next, the process performed when the average value of the remaining stored power amounts of the batteries constituting the first power storage unit and the second power storage unit after the movement to the destination floor does not exceed the first threshold value (YES in step S0401), will be described.

The average value not exceeding the first threshold value means that at least one battery cannot drive the load 5 for the certain period of time after the movement, and thus the redundant configuration cannot be maintained.

First, acceptance of operations is prohibited such that the power control device 16 does not accept any operation on the operation panel inside the car 2 and the control panel 17 does not accept any operation on the operation panel at each floor (step S0406).

Specifically, the processor 161 of the power control device 16 transmits an acceptance prohibition signal to the operation panel inside the car 2, and the operation panel stops acceptance of any operation. In addition, the processor 161 of the power control device 16 also transmits the acceptance prohibition signal to the control panel 17, the processor 171 of the control panel 17 transmits the acceptance prohibition signal to the operation panel at each floor, and the operation panel stops acceptance of any operation. In the case where the elevator 100 includes a display device inside the car 2 or at each floor, the power control device 16 or the control panel 17 may control the display device to perform display for operation suspension.

Next, the power control device 16 or the control panel 17 performs processes from step S0402' to step S0405'. The processes from step S0402' to step S0405' are almost the same as those from step S0402 to step S0405, and thus the differences in each step will be described.

In step S0403, the car 2 starts moving to the destination floor, but in step S0403', the car 2 starts moving to the nearest stop floor (floor immediately above or below the present stop floor). This is for evacuating the passenger promptly, due to a possibility that the remaining stored power amount becomes insufficient to hinder safe operation.

Specifically, the processor 161 of the power control device 16 reads the information of the present stop floor stored in the memory 162, and transmits a destination floor signal in which the floor immediately above or below the present stop floor is set as a destination floor, to the control panel 17. The control panel 17 having received the destination floor signal controls the drive device 4 to move the car 2 to the destination floor.

In step S0404, the power control device 16 determines the end of the charging, based on whether or not the remaining stored power amount of the battery constituting the second power storage unit is equal to the average value of the remaining stored power amounts after the movement, but in step S0404', the power control device 16 performs a process using whether or not the first power storage unit is fully charged as a criterion. Whether or not the remaining stored power amount of the battery constituting the second power storage unit is equal to the average value is not used as a criterion. Therefore, the second power storage unit continues to supply power even when the remaining stored power amount thereof becomes less than the average value and the first threshold value. That is, regardless of the remaining stored power amount of the battery constituting the second power storage unit after power is supplied to the first power storage unit, supply of power is performed, and power is collected in the first power storage unit. As a result, the remaining stored power amount of the battery constituting the first power storage unit exceeds the first threshold value. Specifically, for the battery constituting the first power storage unit, the processor 161 of the power control device 16 calculates the present remaining stored power amount of the battery constituting the first power storage unit, by reading and integrating the current value after the time when the battery is fully charged last time, among the stored current values, and subtracting the resulting value from the remaining stored power amount in a fully charged condition. In addition, the processor 161 reads the third threshold value from the memory 162, and determines whether or not the present remaining stored power amount exceeds the third threshold value. When the present remaining stored power amount exceeds the third threshold value, the processor 161 determines that the charging has been ended. When the present remaining stored power amount does not exceed the third threshold value, the processor 161 determines that the charging has not been ended, and repeats the process. The charging is ended when the remaining stored power amount of the battery constituting the first power storage unit reaches the fully charged amount (exceeds the third threshold value). However, for example, in the case where the third threshold value is set to 80% or the like of the remaining stored power amount when the battery constituting the first power storage unit is fully charged, the charging may be continued further even when the remaining stored power amount of the battery constituting the first power storage unit exceeds the third threshold value.

After the power control device 16 stops the power transmission circuit 14 (step S0405'), the control panel 17 drives the drive device 4 to start the movement of the car 2 to the power supply floor (step S0006'). This process is the same as that in step S0006.

Then, the power control device 16 and the control panel 17 perform a charging process (step S0007'). This process is a process of supplying power to the battery that needs to be charged, in a non-contact manner at the power supply floor to charge the battery, and is the same as that in step S0007. This process is shown in FIG. 7 to FIG. 9, and will be described in detail later.

After the charging process is ended, the power control device 16 releases the prohibition of acceptance of operations on the operation panel inside the car 2, and the control panel 17 releases the prohibition of acceptance of operations on the operation panel at each floor (step S0407).

Specifically, the processor 161 of the power control device 16 transmits an acceptance prohibition release signal to the operation panel inside the car 2, and the operation panel resumes acceptance of operations. In addition, the processor 161 of the power control device 16 also transmits the acceptance prohibition release signal to the control panel 17, the processor 171 of the control panel 17 transmits the acceptance prohibition release signal to the operation panel at each floor, and the operation panel resumes acceptance of operations. The example has been described in which in the case where the elevator 100 includes a display device inside the car 2 or at each floor, the power control device 16 or the control panel 17 controls the display device to perform display for operation suspension. In this case, the power control device 16 or the control panel 17 controls the display device to stop the display for operation suspension.

As described above, the process of the flowchart in FIG. 6 is ended.

Next, the charging process (step S0007 and step S0007') included in the flowcharts in FIG. 4 and FIG. 6 will be described in detail with reference to FIG. 7 to FIG. 9. As described above, this process is a process of charging the battery 8 or the battery 9 at the power supply floor.

The charging process is started in a state where the car 2 has started moving to the power supply floor in step S0006 and step S0006' which are the processes before step S0007 and step S0007'.

First, as shown in FIG. 7, the power control device 16 determines whether both the first power storage unit and the second power storage unit need to be charged (step S0701).

Specifically, the processor 161 of the power control device 16 reads the respective present remaining stored power amounts of the first power storage unit and the second power storage unit from the memory 162. These remaining stored power amounts are the amounts calculated in step S0002 or step S0005 in FIG. 4. Furthermore, the processor 161 reads the second threshold value from the memory 162, and determines whether or not each remaining stored power amount is less than the second threshold value. If each remaining stored power amount is less than the second threshold value, the processor 161 determines that both the first power storage unit and the second power storage unit need to be charged. On the other hand, when any of the remaining stored power amounts is not less than the second threshold value, the processor 161 determines that it is not necessary to charge both the first power storage unit and the second power storage unit. In addition, along with this determination, the processor 161 stores the information of the power storage unit whose remaining stored power amount is less than the second threshold value, that is, the battery constituting the power storage unit that needs to be charged, in the memory 162.

Next, the process performed when it is determined in step S0701 that the number of batteries to be charged is two (YES in step S0701) will be described.

First, the power control device 16 compares the remaining stored power amounts of the batteries constituting the first power storage unit and the second power storage unit, sets the switch provided between the power storage unit composed of the battery having a smaller remaining stored power amount and the charging circuit 12 and the switch provided between the power storage unit composed of the battery having a smaller remaining stored power amount and the load 5, to be ON, and sets the switch provided between the power storage unit composed of the battery having a larger remaining stored power amount and the charging circuit 12 and the switch provided between the power storage unit composed of the battery having a larger remaining stored power amount and the load 5, to be OFF (step S0702). At this time, the battery that supplies power to the load 5 may be changed. In this case, the first power storage unit and the second power storage unit are also changed.

Specifically, the processor 161 of the power control device 16 compares the magnitudes of the remaining stored power amounts of the batteries constituting the first power storage unit and the second power storage unit which are read from the memory 162, and determines which of the remaining stored power amounts of the power storage units is smaller. Then, for example, when the battery 8 constitutes the first power storage unit, and the remaining stored power amount of the battery 8 constituting the first power storage unit is smaller, the processor 161 transmits an ON signal for setting a switch to be ON, to the switch 11*a* provided between the first power storage unit and the charging circuit 12 and the switch 13*a* provided between the power storage unit and the load 5, to bring the switch 11*a* and the switch 13*a* into an ON state. Furthermore, the processor 161 transmits an OFF signal for setting a switch to be OFF, to the switch 11*b* provided between the second power storage unit and the charging circuit 12 and the switch 13*b* provided between the second power storage unit and the load 5, to bring the switch 11*b* and the switch 13*b* into an OFF state. In this case, the battery 8 constituting the first power storage unit which supplies power to the load 5, and the battery constituting the second power storage unit which does not supply power to the load 5 are not changed.

On the other hand, when the battery 9 constitutes the second power storage unit, and the remaining stored power amount of the battery 9 constituting the second power storage unit is smaller, the processor 161 transmits an ON signal to the switch 11*b* and the switch 13*b* to bring the switch 11*b* and the switch 13*b* into an ON state, and transmits an OFF signal to the switch 11*a* and the switch 13*a* to bring the switch 11*a* and the switch 13*a* into an OFF state. In this case, the battery that supplies power to the load 5 is changed from the battery 8 to the battery 9, so that the batteries constituting the first power storage unit and the second power storage unit are interchanged.

To summarize the above, as a result of the process in step S0702, the power storage unit having a smaller remaining stored power amount becomes the first power storage unit which supplies power to the load 5, and the power storage unit having a larger remaining stored power amount becomes the second power storage unit which does not supply power to the load 5.

As for the switch that has already been in an ON state before receiving an ON signal and the switch that has already been in an OFF state before receiving an OFF signal, the states thereof do not change.

Then, the power control device 16 and the control panel 17 determine whether or not the car 2 has arrived at the power supply floor (step S0703).

Specifically, the processor 171 of the control panel 17 determines whether or not the car 2 has arrived at the power supply floor, from the number of rotations of the drive device 4. When the number of rotations of the drive device 4 has not reached the number of rotations required for the movement to the power supply floor, the processor 171 repeats the determination as to whether or not the car 2 has arrived at the power supply floor. In addition, since the processor 171 transmits an arrival signal to the power control device 16 when the car 2 arrives at the power supply floor, the processor 161 of the power control device 16 determines whether or not the arrival signal has been received. When the arrival signal has been received, the processor 161 determines that the car 2 has arrived at the power supply floor. When the arrival signal has not been received, the processor 161 repeats the determination as to whether or not the arrival signal has been received.

When the car 2 arrives at the power supply floor, the control panel 17 drives the power transmission device 6 to store the power transmitted from the power transmission device 6 to the power reception device 7, in the first power storage unit. In addition, the power control device 16 drives and controls the power transmission circuit 14 to store the power discharged from the first power storage unit, in the second power storage unit (step S0704).

Specifically, the processor 171 of the control panel 17 transmits a signal for driving and controlling the power transmission device 6, to the power transmission device 6 to drive and control the power transmission device 6. In addition, the processor 161 of the power control device 16 transmits a signal for driving and controlling the power transmission circuit 14, to the power transmission circuit 14, and the power transmission circuit 14 adjusts the voltage and transmits power from the first power storage unit to the second power storage unit.

After charging of the first power storage unit and the second power storage unit is started, the power control device 16 determines whether or not the charging of either one of the power storage units has been completed (step S0705). Whether or not the charging has been completed is determined based on whether or not the remaining stored power amount of the battery constituting the first power storage unit or the second power storage unit exceeds the third threshold value.

Specifically, for the battery constituting each power storage unit, the processor 161 of the power control device 16 calculates the present remaining stored power amount of each of the batteries constituting the first power storage unit and the second power storage unit, by reading and integrating the current values after the time when the battery is fully charged last time, among the stored current values, and subtracting the resulting value from the remaining stored power amount in a fully charged condition. Then, the processor 161 reads the third threshold value stored in the memory 162, and determines whether the remaining stored power amount of the battery constituting the first power storage unit or the second power storage unit exceeds the third threshold value. When both the remaining stored power amounts of the batteries constituting the first power storage unit and the second power storage unit do not exceed the third threshold value, the processor 161 repeats this process. When either one of the remaining stored power amounts exceeds the third threshold value, the processor 161 determines that the charging of either one of the power storage units has been completed. The third threshold value is larger than the first threshold value and the second threshold value, and is denoted by T3 in FIGS. 5A to 5C. The third threshold value may be the remaining stored power amount when the battery is fully charged, or in consideration of suppression of deterioration of the battery, the third threshold value may be set to a percentage of the remaining stored power amount when the battery is fully charged, for example, about 80% thereof.

Then, as shown in FIG. 8, the power control device 16 determines whether or not the charging of the first power storage unit has been completed (step S706).

Specifically, the processor 161 of the power control device 16 determines whether or not the remaining stored power amount of the battery constituting the first power storage unit which is calculated in step S0705 exceeds the third threshold value.

When the charging of the first power storage unit has been completed (YES in step S706), the power control device 16 increases the output of the power transmission circuit 14 to increase the charging amount of the second power storage unit (step S707). In other words, the second power storage unit is quickly charged.

Specifically, the processor 161 of the power control device 16 transmits a signal for increasing the output of the power transmission circuit 14, to the power transmission circuit 14, and the power transmission circuit 14 increases the voltage to increase the power transmitted from the first power storage unit to the second power storage unit. At this time, since the first power storage unit is fully charged, the processor 171 of the control panel 17 may decrease the output of the power transmission device 6 and supply power that is sufficient for the second power storage unit and the power consumption of the load 5.

While the second power storage unit is being charged, the power control device 16 determines whether or not the charging of the second power storage unit has been completed (step S708).

The process in step S708 is the same as the process in step S705, but since the charging of the first power storage unit has already been completed, whether or not the charging of the second power storage unit has been completed is determined.

When the charging of the second power storage unit has been completed, the charging of all the power storage units has been completed, so that the power control device 16 stops the power transmission circuit 14, and the control panel 17 stops the power transmission device 6, to end the charging (step S0709).

Specifically, the processor 161 of the power control device 16 transmits a signal for stopping the power transmission circuit 14, to the power transmission circuit 14 to stop the power transmission circuit 14. In addition, the processor 161 transmits a signal indicating that the charging has been completed, to the control panel 17. The processor 171 of the control panel 17 having received the signal indicating that the charging has been completed, transmits a signal for stopping the power transmission device 6, to the power transmission device 6 to stop the power transmission device 6.

Then, the power control device 16 sets the switch 11a and the switch 11b, which are provided between the first power storage unit and the charging circuit 12 and between the second power storage unit and the charging circuit 12, to be OFF, sets either one of the switch 13a and the switch 13b, which are between the first power storage unit and the load 5 and between the second power storage unit and the load 5, to be ON, and sets the other of the switch 13a and the switch 13b to be OFF (step S0710). The switch that is set to be ON, out of the switch 13a and the switch 13b, is the switch provided between the load 5 and the power storage unit that has not supplied power to the load 5 before the charging process is started.

Specifically, the processor 161 of the power control device 16 transmits an OFF signal to the switch 11a and the switch 11b to bring the switch 11a and the switch 11b into an OFF state. In addition, the processor 161 reads information for identifying the switch to which an ON signal has been transmitted before the charging process is performed, from the memory 162, and transmits an OFF signal to the switch that has been in an ON state, out of the switch 13a and the switch 13b, and transmits an ON signal to the other switch, to bring one of the switch 13a and the switch 13b into an ON state and bring the other switch into an OFF state. As for the switch that has already been in an ON state before receiving an ON signal and the switch that has already been in an OFF state before receiving an OFF signal, the states thereof do not change. In addition, when the processor 161 of the power control device 16 has transmitted an ON signal to either the switch 13a or the switch 13b before performing this charging process, the processor 161 has stored information for identifying the switch to which the ON signal has been transmitted, and the information of the first power storage unit which is supplying power to the load 5, in the memory 162.

As described above, the process of the flowcharts in FIG. 7 and FIG. 8 is ended.

Next, the process performed when the charging of the first power storage unit has not been completed in step S706 in FIG. 8 (NO in step S706) will be described. In this case, the charging of the second power storage unit has been completed.

First, the power control device 16 stops the power transmission circuit 14 to end the charging of the second power storage unit (step S711). This process is the same as the process of the power control device 16 stopping the power transmission circuit 14, in the process in step S709.

Next, the power control device 16 determines whether or not the charging of the first power storage unit has been completed (step S0712). This process is the same as the process in step S708 except that the power storage unit that is the determination target is the first power storage unit.

When the charging of the first power storage unit has been completed, the charging of all the power storage units has been completed, so that the control panel 17 stops the power transmission device 6 to end the charging (step S713). This process is the same as the process of the control panel 17 stopping the power transmission device 6, in the process in step S709.

Then, the power control device 16 performs a switch switching process (step S710), and the process of flowcharts in FIG. 7 and FIG. 8 is ended.

Next, the process performed when it is determined in step S701 in the process of the flowchart in FIG. 7 that the number of power storage units to be charged is not two (NO in step S0701) in the charging process, will be described with reference to FIG. 9.

First, the power control device 16 determines whether or not the power storage unit that needs to be charged is the first power storage unit (step S0713).

Specifically, the processor 161 of the power control device 16 reads the information (see step S701) of the power storage unit determined to need to be charged and the information of the first power storage unit which supplies power to the load 5, and determines whether or not the power storage units indicated by these pieces of information are identical to each other. When these power storage units are identical to each other, the processor 161 determines that the power storage unit that needs to be charged is the first power storage unit. When these power storage units are not identical to each other, the processor 161 determines that the power storage unit that needs to be charged is not the first power storage unit.

When it is determined that the power storage unit that needs to be charged is the first power storage unit (YES in step S0713), the power control device 16 and the control panel 17 determine whether or not the car 2 has arrived at the power supply floor (step S0703'). This process is the same as that in step S703.

Then, the control panel 17 drives the power transmission device 6 to charge the first power storage unit (step S0714). This process is the same as the process performed by the control panel 17 in the process in step S0704. At this time, since the second power storage unit does not need to be charged, the power transmission circuit 14 is not driven.

Next, the power control device 16 determines whether or not the charging of the first power storage unit has been completed (step S0712'). This process is the same as that in step S712.

When the charging of the first power storage unit has been completed, the control panel 17 stops the power transmission device 6 to end the charging (step S0713'). This process is the same as that in step S0713.

Then, the power control device 16 sets the switch 11a and the switch 11b, which are provided between the first power storage unit and the charging circuit 12 and between the second power storage unit and the charging circuit 12, to be OFF, sets either one of the switch 13a and the switch 13b, which are between the first power storage unit and the load 5 and between the second power storage unit and the load 5, to be ON, and sets the other of the switch 13a and the switch 13b to be OFF (step S710'). This process is the same as that in step S0710.

As described above, the process of the flowcharts in FIG. 7 and FIG. 9 is ended.

Next, the process performed when it is determined that the power storage unit that needs to be charged is not the first power storage unit (NO in step S0713) will be described.

First, the power control device 16 sets the switch provided between the first power storage unit and the load 5, to be OFF, and sets the switch provided between the second power storage unit and the load 5, to be ON. In addition, the power control device 16 sets the switch provided between the second power storage unit and the charging circuit 12, to be ON (step S0715). That is, the power storage unit that supplies power to the load 5 is changed.

Specifically, the processor 161 of the power control device 16 reads the information of the switch that has been in an ON state before the charging process is performed, from the memory 162, and transmits an OFF signal to the switch that has been in an ON state, out of the switch 13a and the switch 13b, and transmits an ON signal to the other switch, to bring one of the switch 13a and the switch 13b into an ON state and bring the other switch into an OFF state. In addition, when the processor 161 has brought the switch 13a into an ON state, the processor 161 transmits an ON signal to the switch 11a to bring the switch 11a into an ON state. On the other hand, when the processor 161 has brought the switch 13b into an ON state, the processor 161 transmits an ON signal to the switch 11b to bring the switch 11b into an ON state.

Then, the power control device 16 and the control panel 17 determine whether or not the car 2 has arrived at the power supply floor (step S0703"). This process is the same as that in step S703.

Furthermore, the control panel 17 drives the power transmission device 6 to charge the power storage unit that has newly become the first power storage unit (step S0714'). This process is the same as that in step S714.

Then, the power control device 16 determines whether or not the charging of the first power storage unit has been completed (step S0712"). This process is the same as that in step S712.

When the charging of the first power storage unit has been completed, the control panel 17 stops the power transmission device 6 to end the charging (step S0713"). This process is the same as that in step S0713.

As described above, the process of the flowcharts in FIG. 7 and FIG. 9 is ended.

The elevator 100 according to Embodiment 1 of the present disclosure is configured as described above, and achieves the following effects.

The elevator 100 includes the power transmission circuit 14 capable of transmitting power between the battery 8 and the battery 9. When it is determined that the remaining stored power amount of the battery that is the first power storage unit and is supplying power to the load 5 is less than the first threshold value which is the amount of power required for driving the load 5 for the certain period of time, the power transmission circuit 14 supplies power from the second power storage unit composed of the battery that is not supplying power to the load 5, to the first power storage unit to charge the first power storage unit. By supplying power from the second power storage unit to the first power storage unit as described above, operation can be continued without power supply switching. Therefore, it is possible to reduce a possibility that interruption of power to the load 5 occurs.

In the elevator 100, when it is determined that the remaining stored power amount of the battery that is the first power storage unit and is supplying power to the load 5 is less than the first threshold value, and it is necessary to supply power from the second power storage unit to the first power storage unit, if it is determined that the average value of the remaining stored power amounts of the first power storage unit and the second power storage unit exceeds the first threshold value, power is supplied such that the remaining stored power amount of the first power storage unit exceeds the first threshold value and the remaining stored power amount of the second power storage unit does not become less than the first threshold value.

Therefore, both the first power storage unit and the second power storage unit of the elevator 100 are capable of driving the load 5 for the certain period of time even after supply of power. Therefore, the elevator 100 can reduce a possibility that interruption of power to the load 5 occurs, and can also suppress a decrease in redundancy.

In the elevator 100, when it is determined that the remaining stored power amount of the battery that is the first power storage unit and is supplying power to the load 5 is less than the first threshold value, and it is necessary to supply power from the second power storage unit to the first power storage unit, if it is determined that the average value of the remaining stored power amounts of the first power storage unit and the second power storage unit does not exceed the first threshold value, power is supplied from the second power storage unit to the first power storage unit such that the remaining stored power amount of the first power storage unit exceeds the first threshold value, regardless of whether or not the remaining stored power amount of the battery constituting the second power storage unit after supply of power is less than the first threshold value.

When the average value of the remaining stored power amounts of the first power storage unit and the second power storage unit does not exceed the first threshold value, the redundant configuration cannot be maintained even when power is supplied in any manner. Therefore, by collecting power in the first power storage unit which is presently supplying power to the load 5 as described above, at least the remaining stored power amount of the first power storage unit is made larger than the first threshold value, but switching of the first power storage unit and the second power storage unit is not performed. Therefore, the elevator 100 can reduce a possibility that interruption of power to the load 5 occurs.

In the elevator 100, the time required for moving the car 2 to the destination floor and opening the door and the power consumption per unit time of the load 5 are multiplied to calculate predicted power consumption required for moving to the destination floor and opening the door, and the predicted power consumption is subtracted from the present remaining stored power amount of the battery constituting the first power storage unit, thereby predicting the remaining stored power amount after the movement. Then, whether or not the remaining stored power amount after the movement is less than the first threshold value is determined, and whether or not to perform supply of power is determined.

For example, the case where the remaining stored power amount after the movement is not used and the present remaining stored power amount and the first threshold value are compared to determine whether or not to perform supply of power, is considered. In this case, at the time when the present remaining stored power amount becomes less than the first threshold value, it is recognized that the remaining stored power amount is insufficient, so that the time for supplying power from the second power storage unit cannot be ensured, and the service of the elevator 100 has to be stopped once. In addition, after the service is stopped, the car 2 is moved to the power supply floor. During the movement, power is supplied to the load 5 in a state where the remaining stored power amount of the battery constituting the first power storage unit is small, so that deterioration of the battery is likely to progress. On the other hand, in the elevator 100, since the remaining stored power amount after the movement is predicted and supply of power is performed as described above, the remaining stored power amount of the battery constituting the first power storage unit does not become less than the first threshold value, so that the service can be continued. In addition, since power can be supplied to the load 5 in a state where the remaining stored power amount is large, deterioration of the battery can be suppressed.

In the elevator 100, a bidirectional converter is used as the power transmission circuit 14. The use of a bidirectional converter enables supply of power even when any of the batteries is the first power storage unit, and allows the first power storage unit to be charged even when there is a difference in voltage between the first power storage unit and the second power storage unit.

In the elevator 100, when charging both the first power storage unit and the second power storage unit, the first power storage unit is charged with the power transmitted from the power transmission device 6 to the power reception device 7, and the power transmission circuit 14 is driven and controlled to charge the second power storage unit with the power discharged from the first power storage unit.

Since the remaining stored power amounts of the first power storage unit and the second power storage unit are different from each other and there is a difference in voltage therebetween, it is not possible to simultaneously charge both power storage units with the power transmitted from the power transmission device 6 to the power reception device 7. Therefore, when charging both power storage units with the power transmitted from the power transmission device 6 to the power reception device 7, it takes a long time to charge both power storage units. In addition, it is also conceivable to provide a charging circuit to each of the first power storage unit and the second power storage unit in order to simultaneously charge both power storage units, but in this case, the circuit configuration becomes complicated.

In the elevator 100, since the second power storage unit is charged by using the power transmission circuit 14 as described above, even though the one charging circuit 12 is provided, it is possible to simultaneously charge the first power storage unit and the second power storage unit. Therefore, the circuit configuration can be simplified.

In the elevator 100, when charging the first power storage unit and not charging the second power storage unit, the power transmission circuit 14 is not driven, and the second power storage unit is not charged. By not driving the power transmission circuit 14, the power discharged from the first power storage unit is decreased, so that the charging time of the first power storage unit can be shortened. In addition, it is also conceivable to supply the power transmitted from the power transmission device 6 to the power reception device 7, to the second power storage unit, and drive and control the power transmission circuit 14 to charge the first power storage unit, but power loss occurs when power is supplied by the power transmission circuit 14, so that the charging time of the first power storage unit cannot be shortened. However, by directly charging the first power storage unit with the power transmitted from the power transmission device 6 to the power reception device 7 as described above, the charging time of the first power storage unit can be shortened. Therefore, the time for charging at the power supply floor can be shortened, so that the convenience of passengers can be improved.

Here, the description of modifications and supplementary description of the elevator 100 according to Embodiment 1 of the present disclosure will be given.

In Embodiment 1, the elevator 100 includes the battery 8 and the battery 9. When the first power storage unit is composed of the battery 8, the second power storage unit is composed of the one battery 9, and when the first power storage unit is composed of the battery 9, the second power storage unit is composed of the one battery 8. However, the elevator 100 may include a plurality of batteries whose number is three or more. In this case, the number of batteries that supply power to the load 5 is one, that is, the number of batteries constituting the first power storage unit is one, and the number of batteries that do not supply power to the load 5 is a plural number. That is, the number of batteries constituting the second power storage unit is a plural number. In addition, in the case where the elevator 100 includes three or more batteries, power transmission circuits 14 are provided between all the batteries so as to allow power to be supplied between each battery. Regarding the process of the control unit of the elevator 100 in this case, the differences from the case where each power storage unit is one battery will be described below.

In step S0005 in FIG. 4, when whether at least either one of the first power storage unit and the second power storage unit needs to be charged is determined, whether the second power storage unit needs to be charged is determined not for the entire second power storage unit but for the individual batteries. In the other processes as well, the comparison with a threshold value, an average value, or the remaining stored power amount of another battery is made not for the entire second power storage unit but for the individual batteries.

Moreover, in step S0401 in FIG. 6, the processor 161 calculates the average value of remaining stored power amounts, and this average value is the average value of the remaining stored power amounts of the battery constituting the first power storage unit and all the batteries constituting the second power storage unit.

In step S0402 in FIG. 6, the power control device 16 drives and controls the power transmission circuits 14 to charge the first power storage unit, and the power transmission circuits 14 are all the power transmission circuits provided between the battery constituting the first power storage unit and the multiple batteries constituting the second power storage unit.

In step S0402' in FIG. 6, the power control device 16 drives and controls the power transmission circuit 14 to charge the first power storage unit, and the power transmission circuit 14 is the power transmission circuit provided between one battery having a remaining stored power amount not less than the first threshold value, among the batteries constituting the second power storage unit and the battery constituting the first power storage unit, and the other power transmission circuits are not driven and controlled. By supplying power to the first power storage unit from the battery having a remaining stored power amount exceeding the first threshold value, the remaining stored power amount of the battery constituting the first power storage unit exceeds the first threshold value, so that interruption of power to the load 5 is less likely to occur. In addition, since the other batteries of the second power storage unit do not supply power, if there is any battery having a remaining stored power amount exceeding the first threshold value among the other batteries, the redundancy can also be maintained.

In step S0701 in FIG. 7, the power control device 16 determines whether or not the number of power storage units to be charged is two. In the case where three or more batteries are included, the power control device 16 determines whether or not the number of power storage units to be charged is two or more.

In step S0702 in FIG. 7, the power control device 16 compares the remaining stored power amounts of the batteries constituting the first power storage unit and the second power storage unit, and performs ON-OFF control of the switches such that the power storage unit composed of the battery having a smaller remaining stored power amount is changed to the first power storage unit (power storage unit that supplies power to the load 5). When the magnitudes of the remaining stored power amounts are compared, if one battery constituting the second power storage unit has a smallest remaining stored power amount, this battery is changed to the first power storage unit, and the other batteries are regarded as the second power storage unit.

In step S0705 in FIG. 7, the power control device 16 determines whether or not the charging of any of the batteries has been completed. In the case where three or more batteries are provided, the power control device 16 determines whether or not charging of any one of the batteries has been completed.

In step S0710 in FIG. 8, the power control device 16 sets the switch provided between the load 5 and the power storage unit that has not supplied power to the load 5 before the charging process is started, to be ON. Here, the power control device 16 selects one of the multiple batteries constituting the second power storage unit, and sets the switch between the selected battery and the load 5, to be ON. As for this selection, for example, the number of times each battery is charged and discharged may be counted and stored in the memory 162, and the battery having a smallest number of times of charging and discharging may be selected.

In step S0715 in FIG. 9, the power control device 16 sets the switch provided between the first power storage unit and the load 5, to be OFF, and sets the switch provided between the second power storage unit and the load 5, to be ON. In addition, the power control device 16 sets the switch provided between the second power storage unit and the charging circuit 12, to be ON. At this time, the switch provided between one battery (battery determined to need to be charged) constituting the second power storage unit and the load 5 and the switch provided between the one battery and the charging circuit 12 are set to be ON. Then, in step S0712", the remaining stored power amount of this battery and the third threshold value are compared, and whether or not charging of this battery has been completed is determined, and in step S0713", the power transmission device 6 is stopped, and the power transmission circuit 14 is also stopped.

The measuring unit 15 measures the current value with the current detection circuit, but any known circuit that can perform measurement required for calculating the remaining stored power amount of a battery may be used. For example, in the case of calculating a remaining stored power amount using a voltage value, a voltage detection circuit may be used instead of the current detection circuit.

The power control device 16 is provided to the car 2, but may be provided to the hoistway 1, and a communication device may transmit signals to the devices inside the car 2. In addition, the control panel 17 is provided to the hoistway 1, but may be provided to the car 2 and transmit signals to the drive device 4 and the power transmission device 6. The power control device 16 and the control panel 17 may be integrated. In addition, a part of the control panel 17, for example, a part of the interface 173 may be installed around the power transmission device 6.

As the power transmission circuit 14, a bidirectional converter is used, but two unidirectional converters may be used, or any known circuit that can adjust a voltage may be used.

The first threshold value is a value indicating the amount of power required for driving the load 5 for a certain period of time, and the certain period of time is, for example, the time required for moving passengers to the nearest stop floor (floor immediately above or below the present floor) and unloading the passengers in case of an emergency such as an outage, but may be the time required for moving through several floors, not to the nearest floor. In addition, the certain period of time does not need to be set in consideration of only a case of an emergency, and may be set as appropriate according to the situation where the elevator 100 is installed, etc. For example, when the number of power supply floors is smaller and there are fewer opportunities for charging, the first threshold value may be larger. On the other hand, when the number of power supply floors is larger, there are more opportunities for charging, so that the first threshold value may be smaller. In addition, the first threshold value may be changed depending on the time slot.

Moreover, the threshold values other than the first threshold value may also be set as appropriate according to the situation where the elevator 100 is installed, etc.

In Embodiment 1, the remaining stored power amount of the battery 8 or the battery 9 is compared with the threshold value, and the power supply process or the charging process is performed, but the process may be performed using a power storage rate such as a state of charge (SOC). In this case, for example, whether or not the power storage rate is less than a threshold value is determined. When the power storage rate is less than the threshold value, this results in the remaining stored power amount being less than the threshold value. Thus, when the remaining stored power amount is less than the threshold value, the case where determination is performed using the power storage rate is also included.

In step S0002, the power control device 16 calculates past power consumption of the load 5 in order to calculate predicted power consumption. However, the power control device 16 may measure past average power consumption per unit time of the load 5 in a similar building or the like in advance, and may store this average power consumption per unit time in the memory 162. In this case, for example, when the average power consumption per unit time for each time slot is measured and stored in the memory 162, the accuracy of the predicted power consumption is further increased. In addition, the average power consumption per unit time may be calculated from the design value of the load 5 or the like without being based on the past average power consumption per unit time of the load 5, and may be used.

The second power storage unit is composed of the battery that is not supplying power to the load 5, but in addition to the battery that is not supplying power at all, a battery that is supplying a weak current to the load 5 is also included.

Embodiment 2

Next, Embodiment 2 of the present disclosure will be described. The description of the same configurations and operations as those described in Embodiment 1 is omitted, and the differences from Embodiment 1 will be described below. It is noted that an elevator of Embodiment 2 may be provided in combination with the modifications of Embodiment 1.

In Embodiment 1, the example has been described in which two batteries having the same capacity are used and power is supplied to the load 5 while switching between these batteries. However, in Embodiment 2, an example of an elevator will be described in which one battery 208 is used as a main battery, power is supplied from the main battery 208 to the load 5, another battery 209 is composed of a small battery having a small capacity and used as a sub battery, and power is supplied from the sub battery 209 to the main battery 208.

Figure 10:
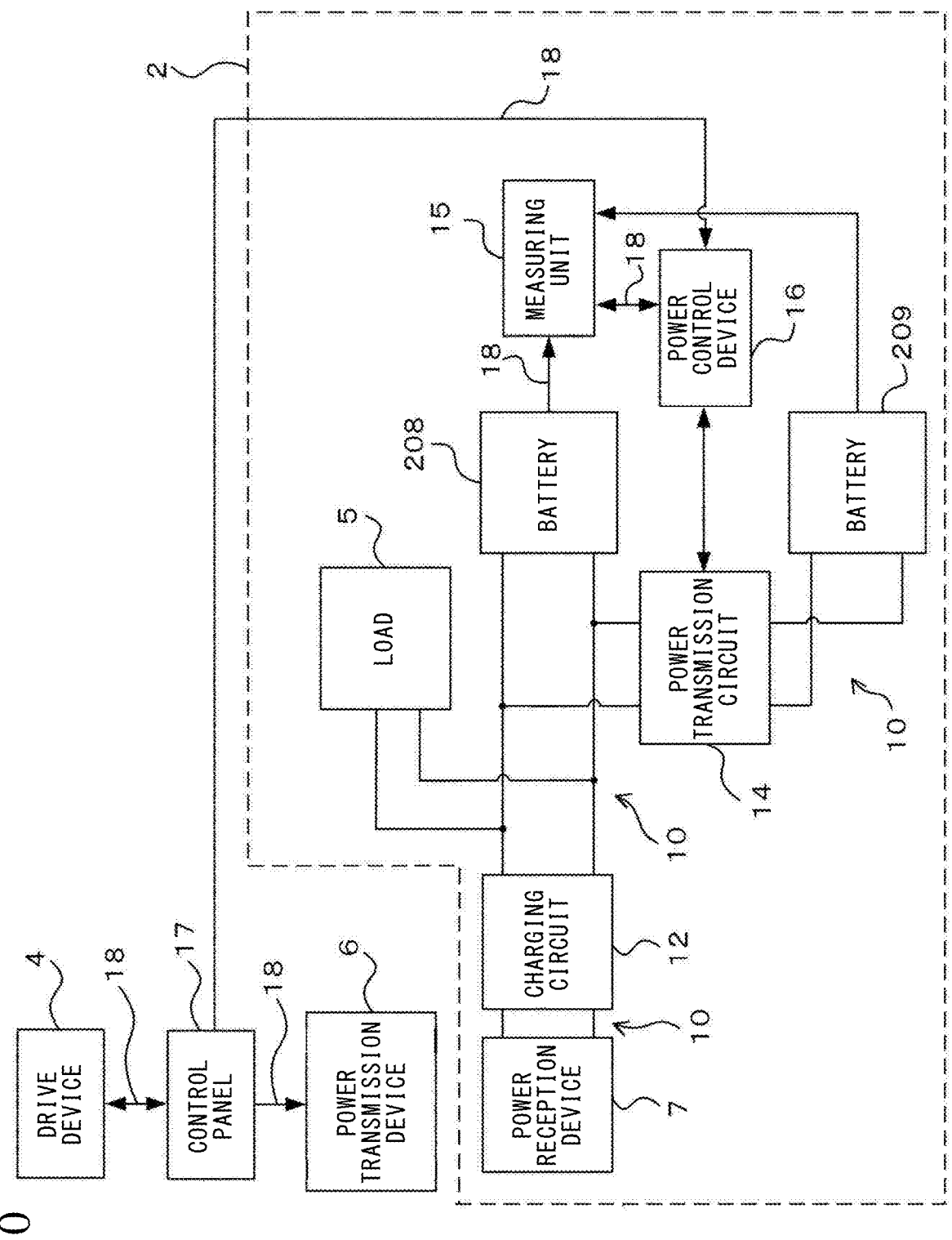
FIG. 10 is a block diagram of a circuit included in an elevator according to Embodiment 2 of the present disclosure.

First, the configuration of the elevator of Embodiment 2 will be described with reference to FIG. 10.

Unlike the elevator 100 of Embodiment 1, the elevator of Embodiment 2 does not include the switch 11a, the switch 11b, the switch 13a, and the switch 13b. In addition, the battery 209 is not directly connected to the charging circuit 12 and the load 5, but is connected to the charging circuit 12 and the load 5 via the power transmission circuit 14. That is, during a charging process, the main battery 208 is charged via the charging circuit 12, and when supplying power to the load 5, the main battery 208 supplies power to the load 5. The sub battery 209 can be charged from the main battery 208 via the power transmission circuit 14. In addition, when the main battery 208 has failed, the sub battery 209 can supply power to the load 5 via the power transmission circuit 14, and the elevator of Embodiment 2 also has a redundant configuration. Furthermore, the main battery 208 supplies power to the load 5 and thus is a first power storage unit, and the sub battery 209 is a second power storage unit.

Figure 11:
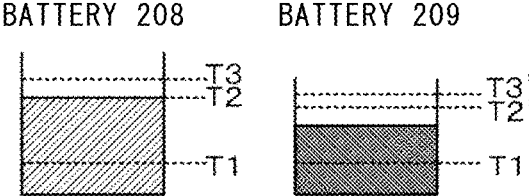
FIG. 11 is a conceptual diagram showing the remaining stored power amounts of power storage units in the elevator according to Embodiment 2 of the present disclosure.

Next, threshold values for the main battery 208 and the sub battery 209 which are used in a power supply process and a charging process will be described with reference to FIG. 11.

Since the main battery 208 and the sub battery 209 have different capacities, different values are used as the third threshold value used to determine whether or not the battery is fully charged. Specifically, a third threshold value T3 for the main battery 208 having a larger capacity is larger than a third threshold value T3' for the sub battery 209 having a smaller capacity. In addition, as for second threshold values T2 and T2' used to determine the necessity of the charging process, the second threshold value T2 for the main battery 208 is larger than the second threshold value T2' for the sub battery 209. However, as for first threshold values T1 and T1' used to determine the necessity of the power supply process, the same values are used. This is because each first threshold value indicates the amount of power required for driving the load 5 for a certain period of time, and is the same value regardless of the difference in battery capacity.

Moreover, in Embodiment 2, in order to suppress deterioration of the main battery 208, the first threshold value T1 and the third threshold value T3 are set using the upper and lower limits of a range of the remaining stored power amount in which the battery 208 is less likely to deteriorate. A range of the remaining stored power amount in which deterioration of the battery is less likely to progress, is obtained in advance by experiments, simulations, or the like, and the first threshold value T1 and the third threshold value T3 are set using the upper and lower limits of this range. The lower limit of the range in which deterioration of the battery is less likely to progress is used as the first threshold value T1. In addition, a value between the upper limit and the lower limit of the range in which deterioration of the battery is less likely to progress is used as the third threshold value T3. The main battery 208 is charged and discharged between the first threshold value T1 and the third threshold value T3, so that deterioration of the main battery 208 can be suppressed by setting the threshold values as described above.

Next, as for the charging process of the elevator of Embodiment 2, the differences from Embodiment 1 (FIG. 7 to FIG. 9) will be described. In the elevator of Embodiment 2, when charging the battery 208 and the battery 209, a process of setting the switch for the battery having a smaller remaining stored power amount, which is the process in step S0702 in FIG. 7, to be ON is not performed. This is because no switch is included. In addition, a switch switching process is also not performed after the charging of both the battery 208 and the battery 209 has been completed (step S0710). Therefore, supply of power to the load 5 is constantly performed by the main battery 208 except for the case where the main battery 208 fails.

Moreover, when the number of batteries to be charged is one (NO in step S0701 in FIG. 7) and when charging the main battery 208 (YES in step S0713 in FIG. 9), a switch switching process is not performed after the charging is completed (step S0710').

Furthermore, when the number of batteries to be charged is one (NO in step S0701 in FIG. 7) and when charging the sub battery 209 (NO in step S0713 in FIG. 9), a switch switching process is not performed for charging the sub battery 209 (step S0715). Instead, in step S0714', the power transmission device 6 is driven and the power transmission circuit 14 is also driven to supply power from the main battery 208 to the sub battery 209 to charge the sub battery 209. At this time, power is supplied to the main battery 208 from the power transmission device 6 by the amount of power to be supplied to the sub battery 209 and the amount of power to be supplied to the load 5. Then, in the process in step S0713″ in FIG. 9, the power transmission circuit 14 is stopped in addition to the power transmission device 6. The process of driving the power transmission circuit 14 is the same as the process performed by the power control device in step S0704, and the process of stopping the power transmission circuit 14 is the same as the process performed by the power control device in step S0709.

The elevator according to Embodiment 2 of the present disclosure is configured as described above, achieves the same effects as those of Embodiment 1, and also achieves the following effects.

In the elevator of Embodiment 2, the first threshold value and the third threshold value which are set using the upper and lower limits of the range of the remaining stored power amount in which the battery is less likely to deteriorate, are used. Since the main battery 208 repeats charging and discharging between the first threshold value and the third threshold value, the main battery 208 can be charged and discharged in a remaining stored power amount in which deterioration is less likely to occur. Therefore, deterioration of the main battery 208 can be suppressed. As for the sub battery 209, the capacity thereof is small, so that the sub battery 209 can be replaced at low cost even when deterioration of the sub battery 209 progresses. In addition, since the main battery 208 constantly supplies power to the load 5, even when the sub battery 209 deteriorates and reaches the end of its life, a decrease in service to passengers is less likely to occur.

INDUSTRIAL APPLICABILITY

The elevator of the present disclosure can be used for transporting passengers within a building.

DESCRIPTION OF THE REFERENCE CHARACTERS 1 hoistway
2 car
3 wire
4 drive device
5 load
6 power transmission device
7 power reception device
8 battery
9 battery
10 conductive wire
11a switch
11b switch
12 charging circuit
13a switch
13b switch
14 power transmission circuit
15 measuring unit
16 power control device
17 control panel
18 signal line
100 elevator
161 processor
162 memory
163 interface
164 transmission line
171 processor
172 memory
173 interface
174 transmission line
208 battery
209 battery

The invention claimed is:

1. An elevator comprising:

a car moving in a hoistway;

a load provided to the car;

a first power storage provided to the car and including one battery configured to be charged and discharged, connected to the load, and configured to supply power to the load;

a second power storage provided to the car and including one or more batteries configured to be charged and discharged, and connected to the load to which the first power storage is connected;

a power transmission circuit provided to the car and configured to transmit power between the first power storage and the second power storage; and a controller to control the power transmission circuit to cause the power transmission circuit to supply power from the second power storage to the first power storage, when a remaining stored power amount of the battery included in the first power storage is determined to be less than an amount of power required for driving the load for a predetermined period of time, the predetermined period of time being a time needed to move passengers to a nearest stop floor in case of an outage.

2. The elevator according to claim 1, wherein
the second power storage includes a plurality of batteries configured to be charged and discharged, and
when the remaining stored power amount of the battery corresponding to the first power storage is determined to be less than the amount of power and the average value of the remaining stored power amounts of the battery corresponding to first power storage and all the batteries corresponding to the second power storage does not exceed the amount of power, regardless of a remaining stored power amount of one battery included in the second power storage after power is supplied, the controller causes the power transmission circuit to supply power from the one battery of the second power storage to the first power storage such that the remaining stored power amount of the battery corresponding to the first power storage exceeds the amount of power.

3. The elevator according to claim 1, wherein the power transmission circuit is a bidirectional converter connected to the second power storage and a conductive wire connecting the load and the first power storage.

4. The elevator according to claim 1, further comprising:
a power transmission device provided to the hoistway; and
a power reception device provided to the car, wherein
when charging both the first power storage and the second power storage, the controller stores power transmitted from the power transmission device to the power reception device, in the first power storage, and controls the power transmission circuit to store power discharged from the first power storage, in the second power storage.

5. The elevator according to claim 1, further comprising:
a power transmission device provided to the hoistway; and
a power reception device provided to the car, wherein
when charging the first power storage and not charging the second power storage, the controller stores power transmitted from the power transmission device to the power reception device, in the first power storage, and does not drive the power transmission circuit.

6. The elevator according to claim 1, wherein
the power transmission circuit includes a bidirectional converter,
any one battery out of a plurality of batteries provided as a whole to the car selectively and switchably corresponds to the first power storage, and
a battery that does not correspond to the first power storage, out of the plurality of batteries provided as a whole to the car, constitutes the second power storage.

7. The elevator according to claim 1, wherein
the power transmission circuit includes a bidirectional converter, and
the first power storage is configured to supply power to the second power storage via the bidirectional converter while supplying power to the load.

8. The elevator according to claim 1, wherein
any one battery out of a plurality of batteries provided as a whole to the car selectively and switchably corresponds to the first power storage, a battery that does not correspond to the first power storage, out of the plurality of batteries provided as a whole to the car, corresponds to the second power storage, and
when the remaining stored power amount of the battery corresponding to the first power storage is determined to be less than the amount of power and an average value of remaining stored power amounts of the battery corresponding to the first power storage and all the batteries corresponding to the second power storage exceeds the amount of power, the controller causes the power transmission circuit to supply power from the second power storage to the first power storage such that the remaining stored power amount of the battery constituting the second power storage does not become less than the amount of power and the remaining stored power amount of the battery corresponding to the first power storage exceeds the amount of power.

9. The elevator according to claim 8, wherein
the second power storage includes one battery configured to be charged and discharged, and
when the remaining stored power amount of the battery corresponding to the first power storage is determined to be less than the amount of power and the average value of the remaining stored power amounts of the battery corresponding to the first power storage and the battery corresponding to the second power storage does not exceed the amount of power, the controller causes the power transmission circuit to supply power from the second power storage to the first power storage such that the remaining stored power amount of the battery corresponding to the first power storage exceeds the amount of power, regardless of the remaining stored power amount of the battery corresponding to the second power storage after power is supplied to the first power storage.

10. The elevator according to claim 1, wherein
based on a present stop floor of the car and a destination floor, the controller calculates predicted power consumption required by the load for moving the car from the present stop floor to the destination floor until opening a door, and when a value obtained by subtracting the predicted power consumption from a present remaining stored power amount of the battery corresponding to the first power storage is less than the amount of power, the controller determines that the remaining stored power amount of the battery corresponding to the first power storage is less than the amount of power required for driving the load for the predetermined period of time.

11. The elevator according to claim 10, wherein the controller is configured to determine whether a passenger is present inside the car based on receipt of information of a destination floor into a memory, and to calculate the predicted power consumption only when it is determined that a passenger is present.

12. The elevator according to claim 10, wherein the controller calculates the predicted power consumption by multiplying a past power consumption per unit time of the load by a movement time required to move the car from the present stop floor to the destination floor and open the door.

* * * * *